US007010687B2

(12) United States Patent
Ichimura

(10) Patent No.: US 7,010,687 B2

(45) Date of Patent: Mar. 7, 2006

(54) TRANSMISSION APPARATUS, RECEPTION APPARATUS, TRANSMISSION METHOD, RECEPTION METHOD AND RECORDING MEDIUM

(75) Inventor: Gen Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 862 days.

(21) Appl. No.: 09/804,511

(22) Filed: Mar. 12, 2001

(65) Prior Publication Data

US 2001/0023484 A1 Sep. 20, 2001

(30) Foreign Application Priority Data

| | | |
|---|---|---|
| Mar. 14, 2000 | (JP) | P2000-076373 |
| Aug. 23, 2000 | (JP) | P2000-252804 |
| Aug. 25, 2000 | (JP) | P2000-260864 |
| Aug. 29, 2000 | (JP) | P2000-264506 |

(51) Int. Cl.
*H04L 9/00* (2006.01)

(52) U.S. Cl. ........................ 713/167; 380/46; 713/189

(58) Field of Classification Search ................ 713/200; 380/283, 21, 277–278, 232, 44, 46; 370/395.64; 358/530, 524; 726/3
See application file for complete search history.

(56) References Cited

U.S. PATENT DOCUMENTS

| | | | | |
|---|---|---|---|---|
| 3,978,288 | A | 8/1976 | Bruckner et al. | 179/1.5 R |
| 5,420,866 | A * | 5/1995 | Wasilewski | 370/426 |
| 5,721,778 | A * | 2/1998 | Kubota et al. | 380/212 |
| 5,917,948 | A * | 6/1999 | Holtz | 382/232 |
| 6,009,174 | A * | 12/1999 | Tatebayashi et al. | 380/277 |
| 6,747,977 | B1 * | 6/2004 | Smith et al. | 370/395.64 |

FOREIGN PATENT DOCUMENTS

| | | |
|---|---|---|
| EP | 0720328 | 7/1996 |
| JP | 0 720 328 A1 * | 7/1995 |

OTHER PUBLICATIONS

Audio and Music Data Transmission Protocol, Audio/Video Working Group of the 1934 Trade Association, Version 1.0, May 1997*

* cited by examiner

*Primary Examiner*—Hosuk Song
*Assistant Examiner*—T. B. Truong
(74) *Attorney, Agent, or Firm*—Jay H. Maioli

(57) ABSTRACT

A transmission apparatus, a reception apparatus, a transmission method, and a reception method, which are used for transmission and reception of encrypted digital data protected against illegal decryption of the encrypted digital data by a third party capable of inferring an encryption algorithm by decryption of a pattern having a known pre-encryption value, and a recording medium for recording the encrypted digital data.

17 Claims, 17 Drawing Sheets

FIG. 5

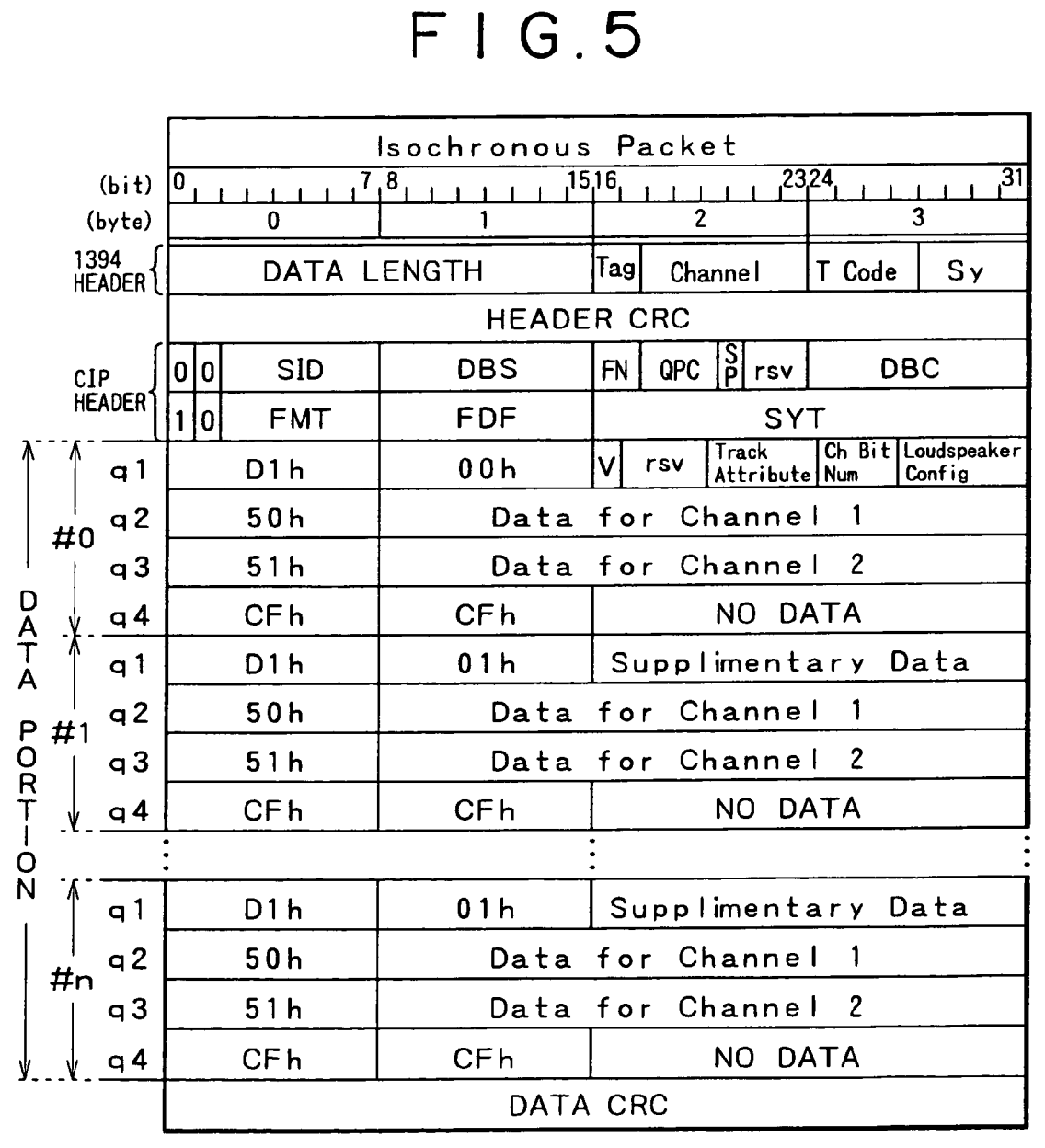

Isochronous Packet

| | | (byte) 0 | 1 | 2 | 3 |
|---|---|---|---|---|---|
| | (bit) | 0–7 | 8–15 | 16–23 | 24–31 |
| 1394 HEADER | | DATA LENGTH | | Tag / Channel | T Code / Sy |
| | | HEADER CRC | | | |
| CIP HEADER | | 0 / 0 / SID | DBS | FN / QPC / SP / rsv | DBC |
| | | 1 / 0 / FMT | FDF | SYT | |
| DATA PORTION #0 | q1 | D1h | 00h | V / rsv / Track Attribute | Ch Bit Num / Loudspeaker Config |
| | q2 | 50h | Data for Channel 1 | | |
| | q3 | 51h | Data for Channel 2 | | |
| | q4 | CFh | CFh | NO DATA | |
| #1 | q1 | D1h | 01h | Supplimentary Data | |
| | q2 | 50h | Data for Channel 1 | | |
| | q3 | 51h | Data for Channel 2 | | |
| | q4 | CFh | CFh | NO DATA | |
| | | ⋮ | ⋮ | ⋮ | |
| #n | q1 | D1h | 01h | Supplimentary Data | |
| | q2 | 50h | Data for Channel 1 | | |
| | q3 | 51h | Data for Channel 2 | | |
| | q4 | CFh | CFh | NO DATA | |
| | | DATA CRC | | | |

FIG. 6

| Value | Description |
|---|---|
| 00h-3Fh | IEC60958 Conformant |
| 40h-4Fh | Multi-bit Linear Audio |
| 50h-57h | One Bit Audio (Plain) |
| 58h-5Fh | One Bit Audio (Encoded) |
| 60h-7Fh | -reserved- |
| 80h-83h | MIDI Conformant |
| 84h-87h | Extended Music Data |
| 88h-8Bh | SMPTE Time Code Conformant |
| 8Ch-8Fh | Sample Count |
| 90h-BFh | -reserved- |
| C0h-EFh | Ancillary Data |
| F0h-FFh | -reserved- |

FIG.7

FRAME

#0

| | byte 0 (bit 0–7) | byte 1 (bit 8–15) | byte 2 (bit 16–23) | byte 3 (bit 24–31) |
|---|---|---|---|---|
| q1 | D1h | 00h | Ancillary data | |
| q2 | 50h | Data for Channel 1 | | |
| q3 | 51h | Data for Channel 2 | | |
| q4 | 51h | Data for Channel 3 | | |
| q5 | 51h | Data for Channel 4 | | |
| q6 | 51h | Data for Channel 5 | | |
| q7 | 51h | Data for Channel 6 | | |
| q8 | CFh | 50h | One-bit Audio No-data | |

#1

| | byte 0 (bit 0–7) | byte 1 (bit 8–15) | byte 2 (bit 16–23) | byte 3 (bit 24–31) |
|---|---|---|---|---|
| q1 | D1h | 01h | Supplementary data | |
| q2 | 50h | Data for Channel 1 | | |
| q3 | 51h | Data for Channel 2 | | |
| q4 | 51h | Data for Channel 3 | | |
| q5 | 51h | Data for Channel 4 | | |
| q6 | 51h | Data for Channel 5 | | |
| q7 | 51h | Data for Channel 6 | | |
| q8 | CFh | 50h | One-bit Audio No-data | |

⋮

#1567

| | byte 0 (bit 0–7) | byte 1 (bit 8–15) | byte 2 (bit 16–23) | byte 3 (bit 24–31) |
|---|---|---|---|---|
| q1 | CFh | D1h | Ancillary No-data | |
| q2 | 50h | Data for Channel 1 | | |
| q3 | 51h | Data for Channel 2 | | |
| q4 | 51h | Data for Channel 3 | | |
| q5 | 51h | Data for Channel 4 | | |
| q6 | 51h | Data for Channel 5 | | |
| q7 | 51h | Data for Channel 6 | | |
| q8 | CFh | 50h | One-bit Audio No-data | |

⋮

LABEL (byte 0)

TRANSMISSION APPARATUS, RECEPTION APPARATUS, TRANSMISSION METHOD, RECEPTION METHOD AND RECORDING MEDIUM

BACKGROUND OF THE INVENTION

The present invention relates to a transmission apparatus, a reception apparatus, a transmission method and a reception method, which are used for transmission and reception of encrypted data protected against illegal decryption of the encrypted data by a third party capable of inferring an encryption algorithm by decryption of a pattern having a known pre-encryption value, and relates to a recording medium for recording the encrypted data.

In many cases, processing to encrypt data is carried out before transmission of the data whose leakage to outsiders is undesirable. Examples of such data are data requiring protection of a copyright, secret data and private data including privacies.

In a transmission of a program comprising a continuous data stream such music and video data, for example, the data stream is encrypted prior to the transmission due to a need for protection of a copyright.

It should be noted that the term program used in this specification is a data set having the form of a continuous data stream. In general, a wide definition of the program thus includes what is called a track corresponding to data representing a piece of music.

FIG. 1 is a block diagram showing a conventional system in which program data is encrypted in a transmission apparatus 101 and then transmitted from the transmission apparatus to a reception apparatus 102.

First of all, clear-text data DT to be transmitted is input to the transmission apparatus 101 in which the data is subjected to an encryption process in an encrypting unit 111, being converted into encrypted data DTs. The encrypted data DTs is output for transmission by a transmission unit 112.

The encrypted data DTs output by the transmission unit 112 is transmitted to the reception apparatus 102 through a transmission line 103 such as an IEEE (the Institute of Electrical and Electronics Engineers)-1394 bus.

In the reception apparatus 102, a reception unit 121 receives the data transmitted through the transmission line 103 and a decryption unit 122 decrypts the data to reproduce the original clear-text data DT.

Since encrypted data DTs is transmitted through the transmission line 103, the confidentiality of the substance of the data DT is protected against a third party even if the third party fetches the data DTs with an evil intention.

When data such as a piece of music is transmitted in a system like the one shown in FIG. 1 for typically protecting a copyright, however, there is a risk of the data's being decrypted to produce an illegal copy.

Assume for example that the data DT of a program to be transmitted is PCM audio data. In the case of PCM audio data, a soundless portion of a stream of the data is an array of zeros. In the case of 1-bit-digital audio data obtained as a result of $\Delta\Sigma$ modulation, on the other hand, the soundless portion is a fixed pattern such as 96h (=10010110).

In the case of program data representing a music track, the beginning and the end of the program are generally soundless. That is to say, a portion immediately preceding a piece of music and a portion immediately following the piece of music each contain soundless data in many cases except a music medley comprising 2 or more linked pieces of music (programs).

Blocks indicated by dotted lines in FIG. 1 include means for encrypting data DT prior to a transmission through the transmission line 103 and means for fetching encrypted data DTs from the transmission line 103.

Normally, it is difficult to analyze the encrypted data DTs in order to obtain the original data DT itself. That is to say, the encrypted data is difficult to decrypt.

It is feared, however, that knowing that the beginning or the end of program data representing a piece of music is soundless data with a known pre-encryption value, an unauthorized third party may extract the portion and decrypt the portion into fixed data on a trial-and-error basis till the fixed data obtained as a result of decryption matches the pre-encryption value in an attempt to infer the encryption algorithm for encrypting the data DT and, hence, to obtain the original data DT.

In addition, at the present time, a service rendered to users to download a piece of music is being implemented. The service downloads a piece of music on an on-demand basis through a public line such as an ISDN (Integrated Standard Digital Network) or an analog line. In general, the user enters information on a desired piece of music to be downloaded via the keyboard of a personal computer, which then transmits the information to a server rendering the service. The information is typically an ISRC (International Standard Record Code), the name of an artist or the title of a song. The name of an artist can be the name of a singer, the name of a performer, the name of a song composer, the name of a song writer or the name of an arranger. Receiving the information, the server searches a hard disc for a piece of music indicated by the information. The server then encrypts the piece of music prior to a transmission to the personal computer. Receiving the encrypted piece of music, the user transmits a credit number or the like to the server. If the server authenticates the credit number, the server transmits a decryption key to the personal computer.

In such a system, however, there is a risk of an unauthorized user's doing illegal operation on the transmitted piece of music. That is to say, such the unauthorized user may probably steal the encrypted piece of music from the network without obtaining a decryption key in order to avoid charging for the music. Then, the user carries out various kinds of work to decrypt a portion of the information on the piece of music on a trial-and-error basis till the result of decryption matches a known pre-encryption value of the portion in an attempt to infer the encryption algorithm. As described above, the information is typically an ISRC (International Standard Record Code), the title of a song or the name of an artist, which can be the name of a singer, the name of a performer, the name of a song composer, the name of a song writer or the name of an arranger.

Of course, once the encryption algorithm is known, the unauthorized user is capable of illegally obtaining the data DT later with ease. That is to say, the unauthorized user is capable of carrying out an illegal deed of infringing a copyright.

Thus, in a broad range of fields including transmission of data between apparatuses, transmission of data for recording the data into recording media and transmission of music data in a music distribution system using a public line, there is a risk described above so that it is necessary to develop a technology for avoiding illegal decryption of transmitted data requiring protection of a copyright such as music data.

SUMMARY OF THE INVENTION

It is thus an object of the present invention addressing the problems described above to provide a technology for preventing transmitted data from being decrypted with ease.

A first embodiment of the present invention is characterized in that random data is inserted into an invalid-data portion in each block of a blocked digital signal to be transmitted and encrypted along with the digital signal prior to a transmission of the encrypted signal including the random data.

A second embodiment of the present invention is characterized in that, if the length of an encryption unit is greater than the length of the invalid-data portion for insertion of random data in each block of a blocked digital signal to be transmitted, random data is inserted into the encryption unit and encrypted along with the encryption unit prior to a transmission of the digital signal.

The present invention provides a transmission apparatus for converting digital data into a packet and transmitting the packet-converted digital data, the apparatus comprising: insertion means for inserting random data into a part of the packet-converted digital data to be transmitted; encryption means for encrypting the packet-converted digital data including the random data inserted by the insertion means; and transmission means for transmitting the digital data encrypted by the encryption means.

The transmission apparatus is further characterized in that the length of an encryption unit encrypted by the encryption means is smaller than the length of the packet-converted digital data and the insertion means inserts random data into each encryption unit.

The present invention also provides a reception apparatus for receiving encrypted digital data including random data in each packet, the apparatus comprising: reception means for receiving encrypted packet-converted digital data; decryption means for decrypting the encrypted packet-converted digital data received by the reception means; and elimination means for removing random data from packet-converted digital data obtained as a result of decryption carried out by the decryption means.

The reception apparatus is further characterized in that the length of a decryption unit decrypted by the decryption means is smaller than the length of the packet-converted digital data and the elimination means eliminates random data from each decryption unit.

A third embodiment of the present invention is characterized in that random data is added to the start and/or the end of a program to be transmitted prior to encryption preceding transmission.

The present invention provides a transmission apparatus for encrypting a program comprising a continuous data stream and transmitting the encrypted program, the apparatus comprising: random-data-generating means for generating random data; addition means for adding the random data generated by the random-data-generating means to the beginning and the end of the program; encryption-processing means for encrypting the program including the random data added thereto by the addition means; and transmission means for transmitting the program encrypted by the encryption-processing means.

The present invention also provides a reception apparatus for receiving an encrypted program comprising a continuous data stream, the apparatus comprising: reception means for receiving the encrypted program comprising a continuous data stream; decryption means for decrypting the encrypted program comprising a continuous data stream received by the reception means; and elimination means for removing random data from the beginning and the end of a program obtained as a result of decryption carried out by the decryption means.

A fourth embodiment of the present invention is characterized in that the main data and additional data associated with the main data are encrypted prior to transmission.

The present invention provides a transmission apparatus for encrypting a plurality of data blocks comprising main data and additional data and transmitting the encrypted data blocks, the apparatus comprising: additional-data-inserting means for carrying out processing to insert additional data into data blocks selected at random among a sequence of aforementioned data blocks composing a stream of the main data; encryption means for encrypting the sequence of data blocks after the processing carried out by the additional-data-inserting means to insert additional data; and transmission means for transmitting the sequence of data blocks encrypted by the encryption means.

BRIEF DESCRIPTION OF THE DRAWINGS

FIG. 5 is a diagram showing a CIP data structure;

FIG. 6 is a diagram showing each label value in the CIP data structure and its description;

FIG. 7 is a diagram showing a data structure of an isochronous packet Iso with random noises recorded in data portions as invalid data;

DETAILED DESCRIPTION OF THE PREFERRED EMBODIMENTS

Preferred embodiments of the present invention are described in the following order.

1: Typical Application of the Invention to Transmission and Reception Apparatuses
2: IEEE-1394 Transmission Format
3: First Example of Adding Random Noise in IEEE-1394 Transmission of Audio Packet Data
4: Second Example of Adding Random Noise in IEEE-1394 Transmission of Audio Packet Data
5: Third Example of Adding Random Noise in IEEE-1394 Transmission of Audio Packet Data
6: Fourth Example of Adding Random Noise in IEEE-1394 Transmission of Audio Packet Data
7: Typical Application of the Invention to Recording and Playback Apparatuses

1: Typical Application of the Invention to Transmission and Reception Apparatuses The following description explains an embodiment applying a data-transmitting apparatus and a data-transmitting method, which are provided by the present invention, to a transmission apparatus, and a data-decrypting apparatus and a data-decrypting method, which are also provided by the present invention, to a reception apparatus.

Figure 1:
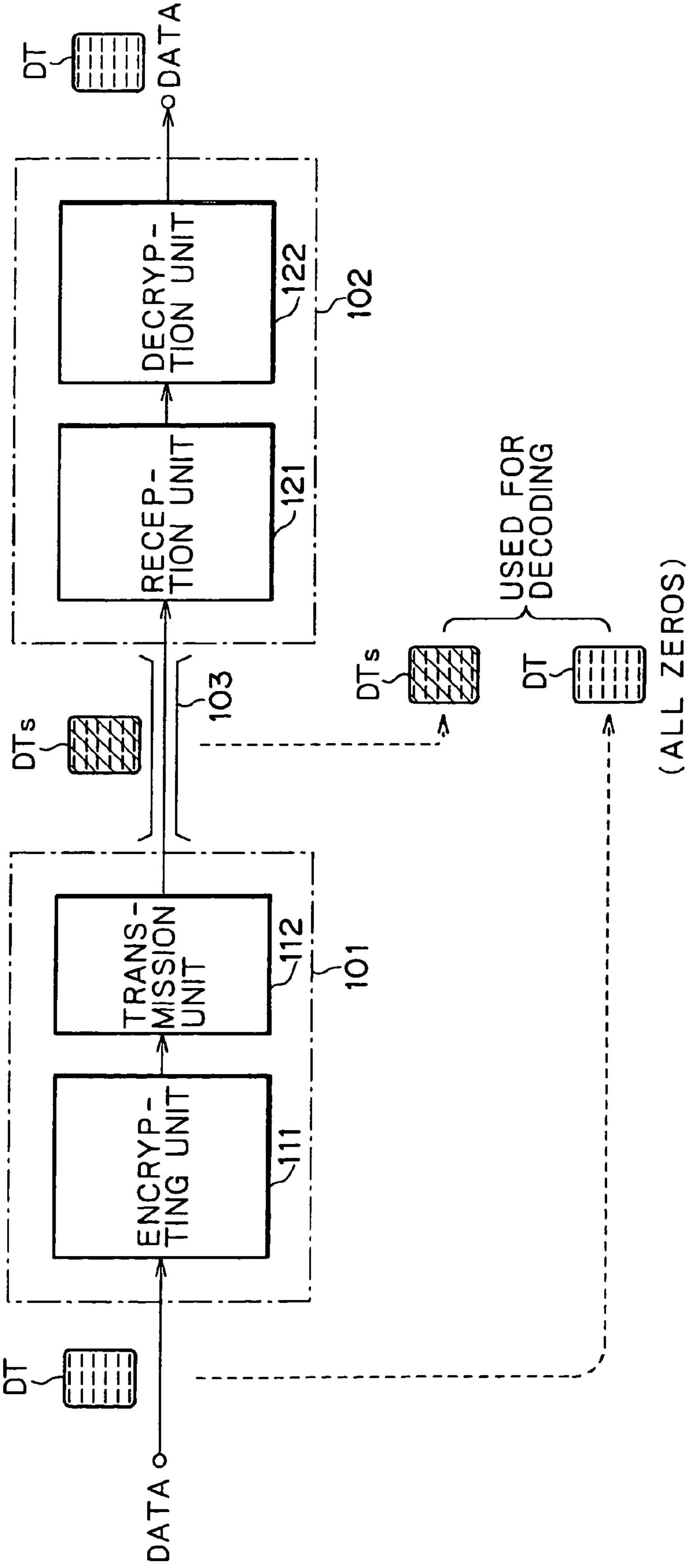
FIG. 1 is a block diagram showing the conventional transmission system.
Figure 2:
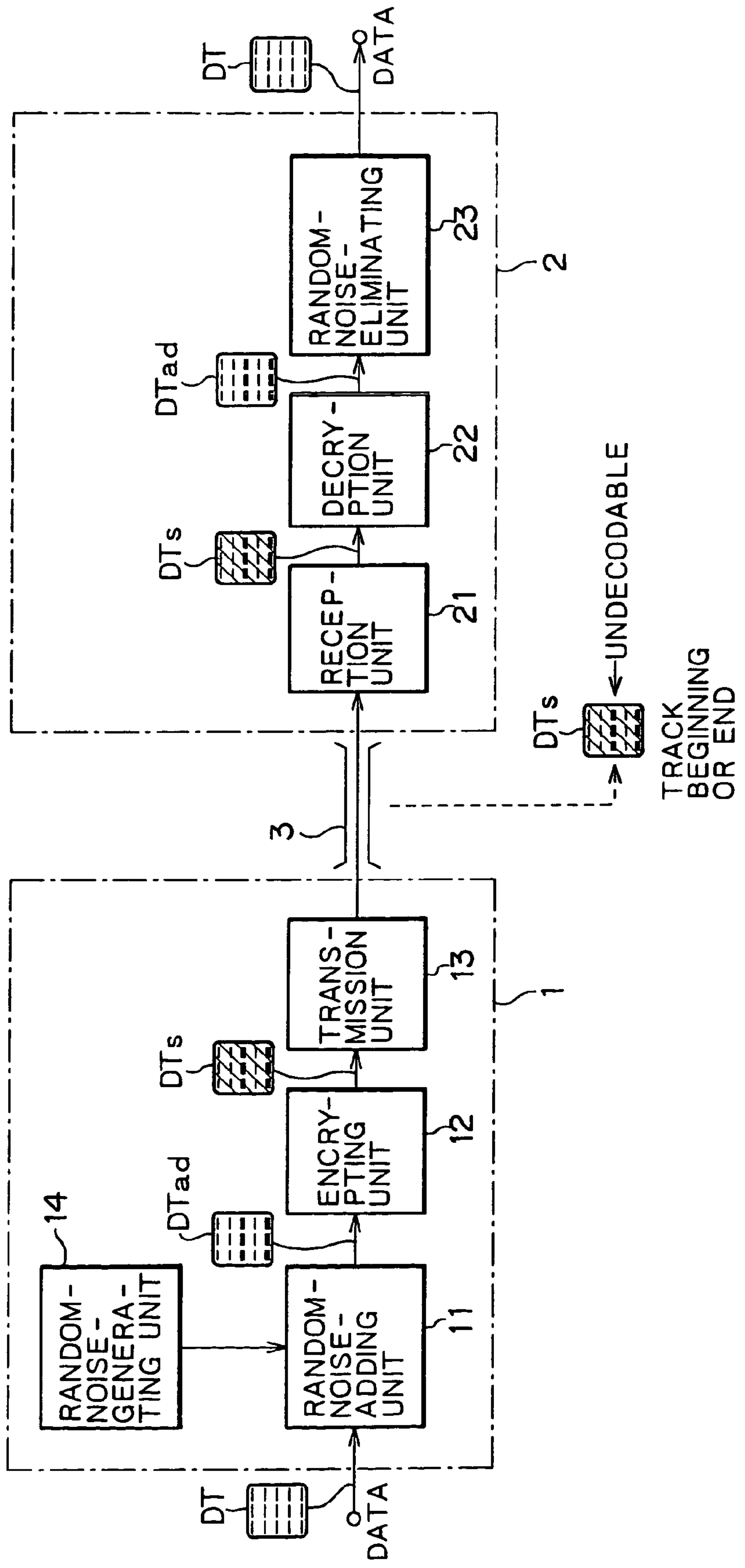
FIG. 2 is a block diagram showing a transmission system implemented by a first embodiment of the present invention.

FIG. 2 is a block diagram showing a transmission & reception model implemented by a first embodiment of the present invention. In the transmission & reception model, transmission equipment employing a transmission apparatus 1 transmits program data DT to reception equipment employing a reception apparatus 2 through a transmission line 3 implemented by an IEEE-1394 bus.

As will be described in detail later, the program data DT is typically a result of packet conversion or blocking of 1-bit-digital audio data in a format conforming to a predetermined transmission protocol.

The 1-bit-digital audio data is data having a quality higher than audio data recorded on an ordinary CD (Compact Disc). To be more specific, the 1-bit-digital audio data is obtained as a result of ΔΣ modulation at a typical very high sampling frequency of 2.842 MHz, which is 16 times a sampling frequency of 44.1 KHz adopted in a CD system. In the format of the 1-bit-digital audio data, the frequency band is a wide frequency band ranging from a DC-component frequency of 0 to a high frequency of 100 KHz, and a dynamic range of 120 dB can be implemented over the entire audio band range.

It should be noted that, while this embodiment exemplifies transmission of packet-converted 1-bit-digital audio data described above, as a format and a type of the transmitted data itself, those of a linear PCM signal can of course be adopted.

As shown in the figure, the transmission apparatus 1 comprises a random-noise-adding unit 11, an encrypting unit 12, a transmission unit 13 and a random-noise-generating unit 14. The random-noise-generating unit 14 typically includes a random-generation circuit for generating a random noise or random data and supplying the random noise to the random-noise-adding unit 11. The random-noise-adding unit 11 adds the random noise received from the random-noise-generating unit 14 to the beginning and the end of a program such as a piece of music included in data DT to be transmitted. The encrypting unit 12 encrypts the output DTad of the random-noise-adding unit 11 by using a predetermined encryption algorithm. The transmission unit 13 outputs data DTs produced by the encrypting unit 12 to the IEEE-1394 bus serving as the transmission line 3.

The reception apparatus 2 comprises a reception unit 21, a decryption unit 22 and a random-noise-eliminating unit 23.

The reception unit 21 receives data from the transmission line 3. The decryption unit 22 decrypts the data received by the reception unit 21 in accordance with an algorithm corresponding to the encryption algorithm adopted by the encrypting unit 12. The random-noise-eliminating unit 23 removes random noises added by the random-noise-adding unit 11 from the data obtained as a result of decryption.

Figures 3A, 3B, 3C, 3D:
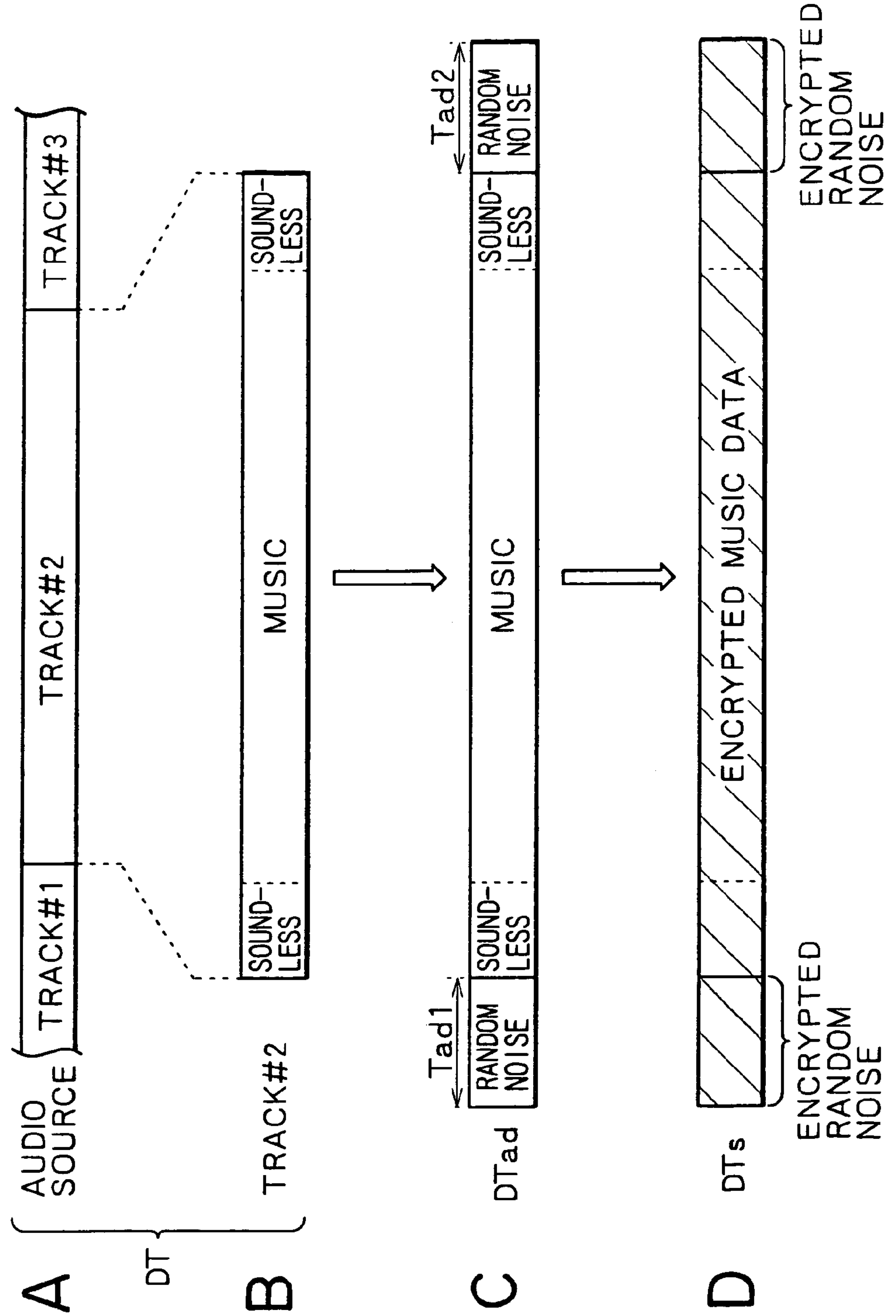
FIG. 3A shows a data stream of a transmitted digital audio signal.
FIG. 3B shows a data stream of a second track of the transmitted digital audio signal shown in FIG. 3A.
FIG. 3C shows the data stream of the second track of the transmitted digital audio signal with a random noise added to each of the beginning and the end of the data stream.
FIG. 3D shows a result of encryption of the data stream of the second track of the transmitted digital audio signal with a random noise added to each of the beginning and the end of the data stream.

1-bit-digital audio data is transmitted from the transmission apparatus 1 to the reception apparatus 2 as follows. Refer to FIGS. 3A to 3D. FIG. 3A shows music data comprising programs or tracks each representing a piece of music. The figure shows an audio data source to be transmitted as data DT. In the case of music data, the beginning and the end of a track are generally soundless as shown in FIG. 3B.

Assume that data DT shown in FIGS. 3A and 3B is supplied to the transmission apparatus 1 as program data such as pieces of music. In this case, the random-noise-adding unit 11 employed in the transmission apparatus 1 inserts random noises each having an arbitrary data length into the beginning and the end of each program in the data DT. For example, the random-noise-adding unit 11 adds a random noise with a data size corresponding to a time duration Tad1 to the beginning of a track and a random noise with a data size corresponding to a time duration Tad2 to the end of the track as shown in FIG. 3C. As will be explained later by showing an example, a block including a random noise is typically added to packet data.

It should be noted that the time durations Tad1 and Tad2, that is, the data lengths of the random noises added to the beginning and the end of a track respectively, can be fixed or changed at random each time the processing to add random noises is carried out. As an alternative, the time durations Tad1 and Tad2 can also be set arbitrarily for each equipment. The more random the data length of an added random noise, the more unobvious the actual soundless-data portion and, hence, the more difficult to carry out the illegal decryption.

Data DTad with random noises added thereto by the random-noise-adding unit 11 is subsequently supplied to the encrypting unit 12 for encrypting the data DTad. As shown in FIG. 3D, the random-noise portions and the music-data portion including the soundless parts are each encrypted. Encrypted data DTs is supplied to the transmission unit 13 for outputting the data DTs to the transmission line 3.

In the reception apparatus 2, the reception unit 21 first of all receives the data DTs from the transmission line 3 and supplies the data DTs to the decryption unit 22. The decryption unit 22 decrypts the data DTs to reproduce the data DTad including the added random noises as shown in FIG. 3C. The data DTad is supplied to the random-noise-eliminating unit 23 for removing the random noises to reproduce the original transmitted data, that is, the data DT shown in FIG. 3B.

Assume that the encrypted data DTs is fetched from the transmission line 3 by using some means as indicated by a dashed arrow in FIG. 2. As described earlier, it is feared that successful decryption of a soundless portion having known pre-encryption contents will lead to successful inference of the encryption algorithm.

Normally, soundless portions each containing known pre-encryption contents such as zeros are placed at the beginning and the end of a track. That is to say, contents of portions at the beginning and the end of a track in the encrypted data DTs must be made unknown in order to prevent the portions from being utilized in illegal decryption to infer the encryption algorithm.

Thus, in this embodiment, random noises are added to the beginning and the end of each track prior to an encryption of the track to produce the data DTs. That is to say, when a track is encrypted, the beginning and the end of the track each no longer contain a fixed pattern such as zero data. Since the beginning and the end of a track in the data DTs each no longer contain known pre-encryption data, efforts made on a trial-and-error basis to decrypt the beginning and the end of the track extracted from the data DTs will be wasteful and, hence, it will be difficult to infer the encryption algorithm.

Particularly, in an analysis of the data DTs, it is impossible to distinguish an element obtained as a result of encrypting a random noise in accordance with the encryption algorithm from an element obtained as a result of encrypting data in accordance with the encryption algorithm to produce the data DTs. Thus, it is all but impossible to infer the encryption algorithm.

In addition, by varying the data length of each added random noise, it is even more difficult for an unauthorized person to extract the random noise in comparison with extraction of a contiguous portion containing all zeros or a fixed pattern. Thus, the security of the encrypted data can be better secured.

As is obvious from the above description, with this embodiment, it is extremely difficult to decrypt data transmitted through the transmission line 3. Thus, the embodiment is very appropriate for transmission of data necessitating protection of a copyright.

In comparison with the conventional system, the transmission apparatus 1 newly includes the random-noise-adding unit 11 and the random-noise-generating unit 14 only whereas the reception apparatus 2 newly includes only the random-noise-eliminating unit 23 for removing random noises from received data after a decryption of the data. In this way, since the configurations of the transmission apparatus 1 and the reception apparatus 2 do not become that complicated, it is easy to incorporate the transmission apparatus 1 and the reception apparatus 2 in various kinds of equipment.

2: IEEE-1394 Transmission Format

Figures 4A, 4B:
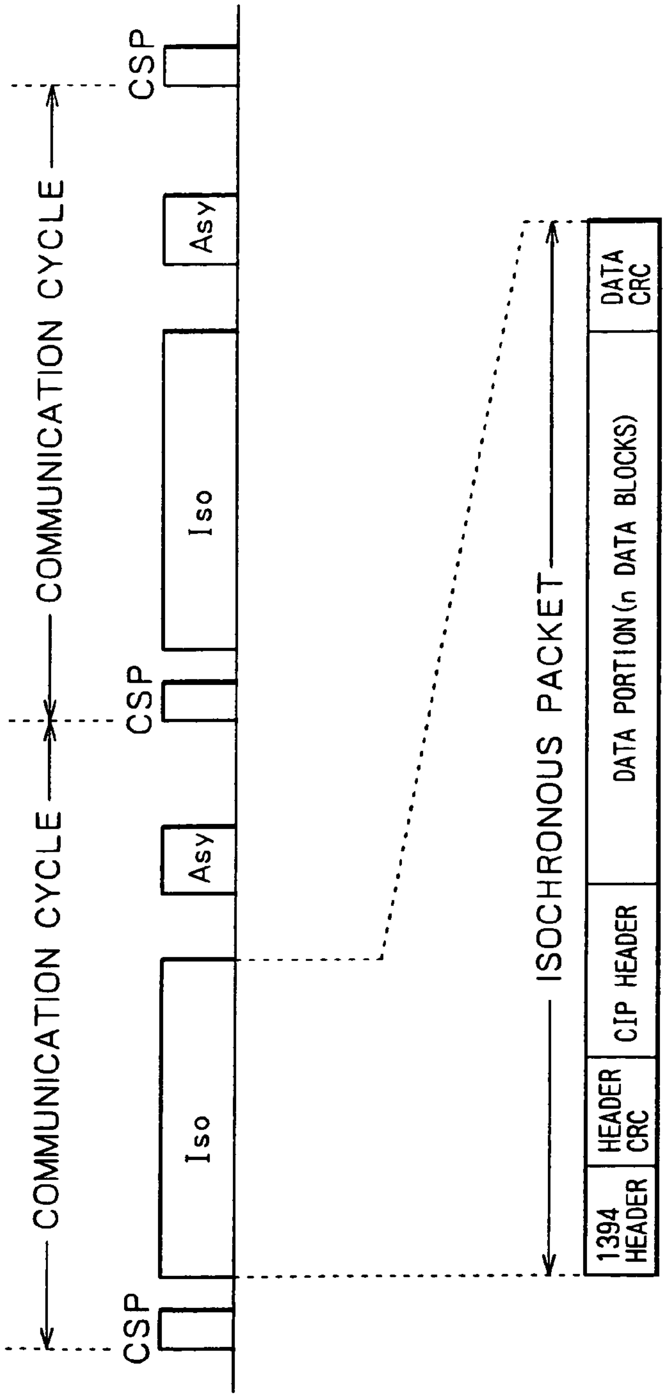
FIG. 4A is a timing diagram of an IEEE-1394 communication.
FIG. 4B shows the data structure of an isochronous packet.

A transmission format conforming to the IEEE-1394 specifications is explained as follows. Data is transmitted in accordance with the IEEE-1394 specifications typically on a time-division basis at a predetermined communication cycle of typically 125 microseconds as shown in FIG. 4A. In this signal transmission, an apparatus known as a cycle master outputs a CSP (cycle start packet) to an IEEE-1394 bus at the beginning of each communication cycle to indicate the beginning of the communication cycle. The cycle master is any arbitrary one of apparatuses connected to the IEEE-1394 bus. A cycle master is determined automatically at the time the apparatuses are connected to a cable serving as the IEEE-1394 bus. The determination of a cycle master is based on a procedure prescribed by the IEEE-1394 specifications. There are 2 different packets transmitted through a communication cycle. One of the packets is an isochronous (Iso) packet for transmitting data with a real-time requirement. Examples of the data with a real-time requirement are video and audio data. The other packet is an asynchronous (Asy) packet for transmitting information such as a control command or auxiliary data with a high degree of reliability.

In each communication cycle, the isochronous packet Iso used for isochronous transmission precedes the asynchronous packet Asy used for asynchronous transmission. After the transmission of the isochronous packet Iso is completed, the period up to the CSP of the next communication cycle is used for a transmission of the asynchronous packet Asy. Thus, the period for the transmission of the asynchronous packet Asy varies in dependence on the number of transmission channels of the isochronous packet Iso. An isochronous packet Iso is transmitted by adoption of a technique whereby a band or a channel count reserved for each communication cycle is assured but not verified on the reception side.

When an asynchronous packet Asy is transmitted, data representing an acknowledgement (Ack) of the reception of the packet Asy is returned from the reception side. In this way, the packet can be transmitted with a high degree of reliability by verifying the state of transmission.

FIG. 4B shows the data structure of a CIP (Common Isochronous Packet), that is, the isochronous packet Iso shown in FIG. 4A. Assume for example that 1-bit-digital audio data described earlier is exchanged as isochronous packets Iso in the IEEE-1394 communication. That is to say, data necessitating that a real-time requirement be satisfied is accommodated in isochronous packets transmitted in a sequence of communication cycles each including one of the packets. An isochronous packet comprises an IEEE-1394 packet header, a header CRC, a CIP header, a data portion and a data CRC (Cyclic Redundancy Code) as shown in FIG. 4B.

A CIP structure used for transmitting 1-bit-digital audio data of 2 channels is explained by referring to an example shown in FIG. 5. A horizontal line of the structure shown in FIG. 5 comprises 32 bits or 4 bytes. Data of a row, that is, the 32-bit data or the 4-byte data, is referred to as a quadlet.

The 32-bit quadlet at the beginning of the CIP is referred to as an IEEE-1394 packet header. The IEEE-1394 packet header comprises data_length, tag, channel, t_code and sy fields. The data_length field is a 16-bit field indicating the length of the data. The tag field is a 2-bit field and the channel field is a 6-bit field. The t_code (time code) and sy (synchronization) fields are each a 4-bit field.

The IEEE-1394 packet header is followed by a header CRC followed by a 2-quadlet area used as a CIP header. The first 2 bits of a first byte of the upper quadlet in the CIP header are set at '0' and '0' respectively. The remaining 6 bits of the byte are used as an area for storing an SID (Source Identification or the number of the transmission node). An 8-bit area following the SID is used for storing a DBS (a data block size) showing the size of a data block or the amount of packet-converted unit data.

A 2-bit field following the DBS is an FN field followed by a QPC area. The FN field specifies the number of divisions used in packet conversion and the QPC field indicates the number of quadlets added for division.

The QPC field is followed by a 1-bit SP field used as a flag of the header of the source packet. The first quadlet is ended with a DBC field for storing the contents of a counter for counting the number of dropouts of the packet. It should be noted that a rsv area preceding the DBC field is an undefined field.

The first 2 bits of a first byte of the lower quadlet in the CIP header are set at '1' and '0' respectively. The remaining 6 bits of the byte are used as an FMT bit followed by an 8-bit FDF field and a 16-bit SYT field.

The FMT field indicates a signal format or a transmission format. That is to say, a value specified in the FMT field represents the format or the type of data stored in the CIP. To put it concretely, the types of data include MPEG (Moving Picture Expert Group) stream data, audio stream data or DV (Digital Video) camera stream data.

The FDF field is a format dependence field for further describing a data format specified in the FMT field in more detail. In the case of audio data specified in the FMT field, the FDF field may indicate linear audio data or MID (Music Instrument Data). Take 1-bit-digital audio data as an example. In this case, the FMT field is set to indicate a type of audio stream data and the FDF field is set at a value indicating that the audio stream data is 1-bit-digital audio data.

The SYT field shows a time stamp for frame synchronization.

The data indicated by the FMT and FDF fields is stored in a data portion following the CIP header. The data portion comprises a sequence of (n+1) data blocks, namely, block #0 to block #n. With the FMT and FDF fields indicating 1-bit-digital audio data, the data blocks are 1-bit-digital audio data.

The data blocks are followed by a data CRC.

FIG. 5 shows an example in which the data portion contains 1-bit-digital audio data of 2 channels. This example is based on a transmission protocol called AM824 applicable to transmission of data through an IEEE-1394 bus. Thus, the figure shows a typical structure of a packet for transmitting 1-bit-digital audio data of 2 channels.

As shown in the figure, in the case of transmission of 1-bit-digital audio data of 2 channels, 1 data block comprises of 4 quadlets, namely, quadlets q1 to q4 each consisting of 32 bits or 4 bytes, and the 1-bit-digital audio data comprises a contiguous sequence of data blocks.

A byte at the beginning of each quadlet, that is, byte 0, is used as a label describing information for identifying data contained in the quadlet. FIG. 6 is a diagram showing each label value in the CIP data structure and its description.

As shown in the figure, the meaning of each label value is described. For example, label values in the range 40h to 4Fh indicate multi-bit linear audio data used in a DVD (Digital Versatile Disc) system. It should be noted that the suffix 'h' appended to each label value indicates that the label value is expressed in the hexadecimal format. Label values in the range 50h to 57h indicate 1-bit-digital audio data, label values in the range 58h to 5Fh indicate encoded 1-bit-digital audio data and label values in the range 80h to 83h indicate MIDI data. Label values in the range C0h to EFh indicate ancillary data or auxiliary data. In this way, label values are defined to function as information used for identifying various kinds of data.

Not directly related to the present invention, a description of detailed definitions of label values is not included in the specification. Thus, only label values shown in FIG. 5 are described as follows. Look at the first quadlet q1 of block #0 shown in FIG. 5. In the first quadlet q1, the label value is D1h indicating that the data in the first quadlet q1 is ancillary data. In the case of ancillary data, byte 1 is used as a sub-label set at 00h. Bytes 2 and 3 contain actual auxiliary data comprising a V field showing a validity flag, a 'Track Attribute' field indicating copy control information, a 'Ch Bit Num' field showing the number of channels and a 'Loudspeaker Config' field showing information on speaker locations.

The label value of the second quadlet q2 is 50h. Label values in the range 50h to 57h indicate 1-bit-digital audio data as described above, and the value 50h indicates the first piece of data in the block containing data for a plurality of channels. The label value of the third quadlet q3 is 51h indicating the second or subsequent piece of data in the block containing data for a plurality of channels. In this way, the label values of the second and third quadlets q2 and q3 indicate that the quadlets contain 1-bit-digital audio data for 2 channels, namely, channels 1 and 2 respectively. The data of a channel is contained in 3 bytes, namely, bytes 1 to 3 of the quadlet for the channel.

The label value of the fourth quadlet q4 is CFh in the range assigned to ancillary data. In particular, the label value of CFh is defined as a value indicating invalid data or no data. The sub-label in byte 1 is set at a value indicating invalid data. In this example, the sub-label is also set at CFh. Thus, bytes 2 and 3 are filled up with invalid data.

In the first quadlet q1 of block #1, the label value is D1h indicating that the data in the first quadlet q1 is ancillary data. In the case of ancillary data, byte 1 is used as a sub-label set at 01h. Bytes 2 and 3 of the auxiliary data describe supplementary data. The second to fourth quadlets are the same as those of block #0.

As described above, the blocks constitute a data portion of the isochronous packet Iso.

3: First Example of Adding Random Noise in IEEE-1394 Transmission of Audio Packet Data The following description explains an example of the use of the transmission format conforming to the IEEE-1394 specifications in the transmission of data explained earlier by referring to FIG. 2. To be more specific, the following description explains a typical method of inserting a random noise into audio packet data transmitted through the IEEE-1394 transmission line 3.

FIG. 7 is a diagram showing a typical data packet structure of data DT to be transmitted. The data structure is based on the AM824 transmission protocol applicable to transmission of data through an IEEE-1394 bus. The typical data structure shown in the figure is used in transmission of 1-bit-digital audio data of 6 channels. It should be noted that a portion consisting of blocks #0 to #1,567 shown as a frame in FIG. 7 corresponds to the data portion of the isochronous packet Iso shown in FIG. 5. In the case of data for 6 channels, 1 block consists of 8 quadlets q1 to q8. The range consisting of 1,568 blocks is a unit called a frame. A data stream transmitted as 1-bit-digital audio data comprises a sequence of such frames.

In the first quadlet q1 of block #0, the label value is set at D1h indicating that the data in first quadlet is ancillary data. In the case of ancillary data, byte 1 is used as a sub-label set at 00h. Bytes 2 and 3 contain actual auxiliary data indicating such as copy control information, the number of channels and information on speaker locations as described earlier by referring to FIG. 5.

The label value of the second quadlet q2 is 50h. Label values in the range 50h to 57h indicate 1-bit-digital audio data as described above, and the value 50h indicates the first piece of data in the block containing data for a plurality of channels.

The label value of each of the third to seventh quadlets q3 to q7 is 51h indicating the second or subsequent piece of data in the block containing data for a plurality of channels. In this way, the label values of the second to seventh quadlets q2 to q7 indicate that the quadlets contain 1-bit-digital audio data for 6 channels, namely, channels 1 to 6 respectively. The data of a channel is contained in 3 bytes, namely, bytes 1 to 3 of the quadlet for the channel.

The label value of the eighth quadlet q8 is CFh in the range assigned to ancillary data. In particular, the label value of CFh is defined as a value indicating invalid data or no data. The sub-label in byte 1 is set at a value indicating invalid data. In this example, the sub-label is also set at 50h indicating invalid 1-bit-digital audio data. Thus, bytes 2 and 3 are filled up with invalid data.

In the first quadlet q1 of block #1, the label value is D1h indicating that the data in the first quadlet q1 is ancillary data. In the case of ancillary data, byte 1 is used as a sub-label set at 01h. Bytes 2 and 3 of the auxiliary data describe supplementary data.

The second to eighth quadlets are the same as those of block #0.

In the first quadlet q1 of block #1567, the label value is CFh indicating that bytes 2 and 3 are invalid data. However, byte 1 is set at D1h indicating invalid ancillary data. The second to eighth quadlets are the same as those of block #0.

In a transmission of such a packet data stream, for example, the random-noise-adding unit 11 employed in the transmission apparatus 1 needs to insert a random noise into each portion provided for invalid data. That is to say, the random-noise-adding unit 11 needs to insert a random noise into each invalid-data portion indicated by a hatched box in each packet. To put it concretely, the random-noise-adding unit 11 generates a 2-byte random noise for each packet to be inserted into a quadlet of invalid data, that is, bytes 2 and 3 respectively of a quadlet with a label value of CFh.

By inserting a random noise as described above, even audio data comprising a fixed pattern such as 96h or all zeros so far in a packet will no longer appear as the fixed pattern such as 96h or all zeros respectively, making the inference of the encryption algorithm impossible as described above. In addition, the insertion of a random noise into an invalid-data portion greatly simplifies the processing carried out by the reception apparatus 2. To put it in detail, after a decryption process is carried out by the decryption unit 22 employed in the reception apparatus 2, a packet data stream with a format shown in FIG. 7 is supplied to the random-noise-eliminating unit 23, which merely needs to discard a quadlet having a label value of CFh. Since a quadlet having a label value of CFh is a quadlet to be discarded anyway, it is not necessary for the random-noise-eliminating unit 23 to carry out special processing due to the insertion of a random noise.

4: Second Example of Adding Random Noise in IEEE-1394 Transmission of Audio Packet Data In the example shown in FIG. 7, a random noise is inserted into a quadlet q8 allocated to invalid data in each of blocks #0 to #1567. That is to say, a random noise is inserted into only one quadlet of each block.

If the transmission format prescribes that the encrypting unit 12 shown in FIG. 2 encrypts data in encryption units each smaller than for example a block, however, inference of the encryption algorithm becomes possible in some cases. Let the encrypting unit 12 encrypt data in 8-byte (2-quadlet) data units (or encryption units). In this case, a portion with no inserted random noises can be analyzed. Consider an encryption unit of 8 bytes for block #0 shown in FIG. 7. Assume that audio data of block #0 is a fixed pattern such as 96h or all zeros.

In this case, the encryption units used in the encryption process are a pair of quadlets q1 and q2, a pair of quadlets q3 and q4, a pair of quadlets q5 and q6 and a pair of quadlets q7 and q8. The pair of quadlets q3 and q4 and the pair of quadlets q5 and q6 are each encrypted with no inserted random noises. It is thus feared that, knowing that a result of decryption is the fixed pattern such as 96h or all zeros, a successful decryption of the extracted pair of quadlets q3 and q4 or the extracted pair of quadlets q5 and q6 carried out on a trial-and-error basis may lead to correct inference of the encryption algorithm useable for illegal decryptions. It should be noted that the pair of quadlets q1 and q2 used as an encryption unit includes encrypted ancillary data. Thus, a result of decryption is not the fixed pattern such as 96h or all zeros and is thus unknown, making it impossible to know whether or not the decryption carried out on a trial-and-error basis has been successful. It is needless to say that the result of decryption of the pair of quadlets q7 and q8 used as an encryption unit including encrypted ancillary data is also not the fixed pattern such as 96h or all zeros and is thus unknown, making it impossible to know whether or not the decryption carried out on a trial-and-error basis has been successful.

Figures 8A, 8B, 8C, 8D:
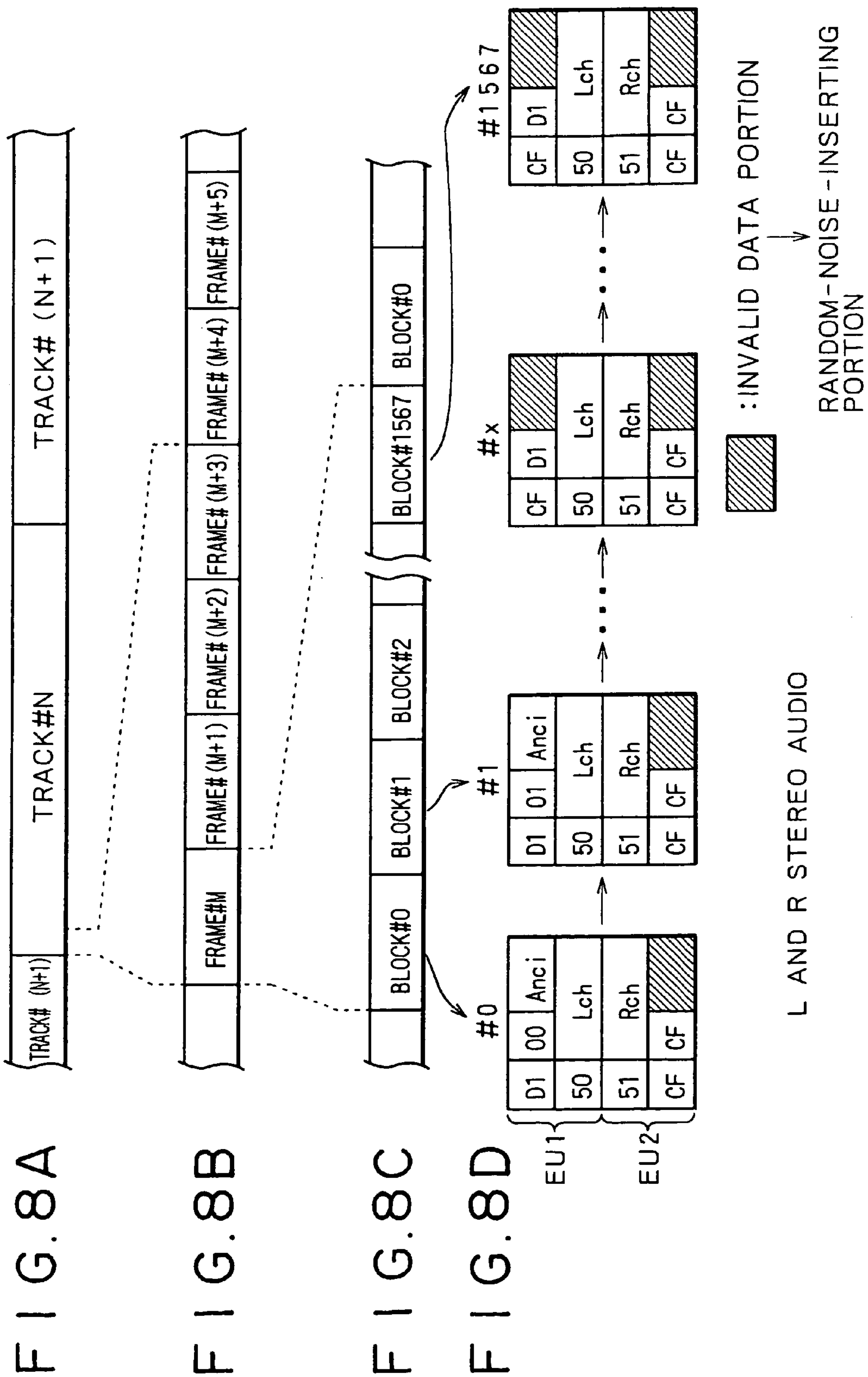
FIG. 8A shows typical tracks of a transmitted digital audio signal.
FIG. 8B shows frames of a track.
FIG. 8C shows blocks composing a frame.
FIG. 8D is a diagram showing the data structure of each block.

Thus, for an encryption unit other than a block unit, that is, for an encryption unit smaller than a block unit, a random noise can be inserted appropriately as follows. FIGS. 8A to 8D show a typical case to transmit 1-bit-digital audio data of 2 channels, namely, left and right channels. It should be noted that FIGS. 8A to 8C are diagrams showing that each track representing a piece of music comprises frames each comprising blocks, namely, blocks #0 to #1567, each having a structure explained earlier by referring to FIGS. 5 and 7.

As is generally known, a frame is a unit corresponding to audio data having a frequency of 75 Hz or a period of 13.3 msec. As described above, each frame comprises 1,568 blocks. In the case of 2-channel data, each of the blocks has a structure shown in FIG. 8D.

Assume that the encryption unit is 8 bytes. In this case, a pair of first and second quadlets is encrypted as an encryption unit EU1 whereas a pair of third and fourth quadlets is encrypted as an encryption unit EU2. That is to say, each block is encrypted as 2 encryption units EUs.

In this case, the random-noise-adding unit 11 employed in the transmission apparatus 1 shown in FIG. 2 adds a random noise at least to each encryption unit EU that may likely contain all zeros or a fixed pattern. Thus, first of all, in the case of block #0, a random noise is inserted into bytes 2 and 3 of the fourth quadlet used as an invalid-data portion of an encryption unit EU2. In FIG. 8D, bytes 2 and 3 are each indicated by a hatched box. A random noise is also inserted into blocks #1 to #(x−1) in the same way as block #0.

In the case of blocks #x to #1567, a random noise is inserted into bytes 2 and 3 of the first quadlet used as an invalid-data portion of an encryption unit EU1 and bytes 2 and 3 of the fourth quadlet used as an invalid-data portion of an encryption unit EU2. Bytes 2 and 3 of the first and fourth quadlets are each indicated by a hatched box.

After a random noise has been inserted as described above, the encrypting unit 12 encrypts the data and outputs the encrypted data to the transmission line 3.

Assume that, in blocks #0 to #(x−1), ancillary data is inserted into the first quadlet. In this case, since data stored in the encryption unit EU1 is neither all zeros nor a fixed pattern, the encryption algorithm for this encryption unit EU1 cannot be inferred. Likewise, since a random noise is inserted into the encryption unit EU2, it is difficult to infer the encryption algorithm even if the audio data stored in the third quadlet in the encryption unit EU2 is a fixed pattern. Thus, extraction and decryption of either encryption unit will not lead to correct inference of the encryption algorithm. As for blocks #x to #1567, a random noise is inserted into both the encryption units EU1 and EU2. For the same reason, extraction and decryption of either encryption unit will not thus lead to correct inference of the encryption algorithm.

Processing carried out by the reception apparatus 2 is extremely simple even if the audio data includes a random noise inserted as described above. This is because the random noise is inserted into invalid-data portions of the audio data. To put it in detail, the decryption unit 22 employed in the reception apparatus 2 outputs a packet data stream like the one shown in FIG. 8D as a result of decryption to the random-noise-eliminating unit 23, which then merely needs to discard each quadlet having a label value of CFh.

Figures 9A, 9B:
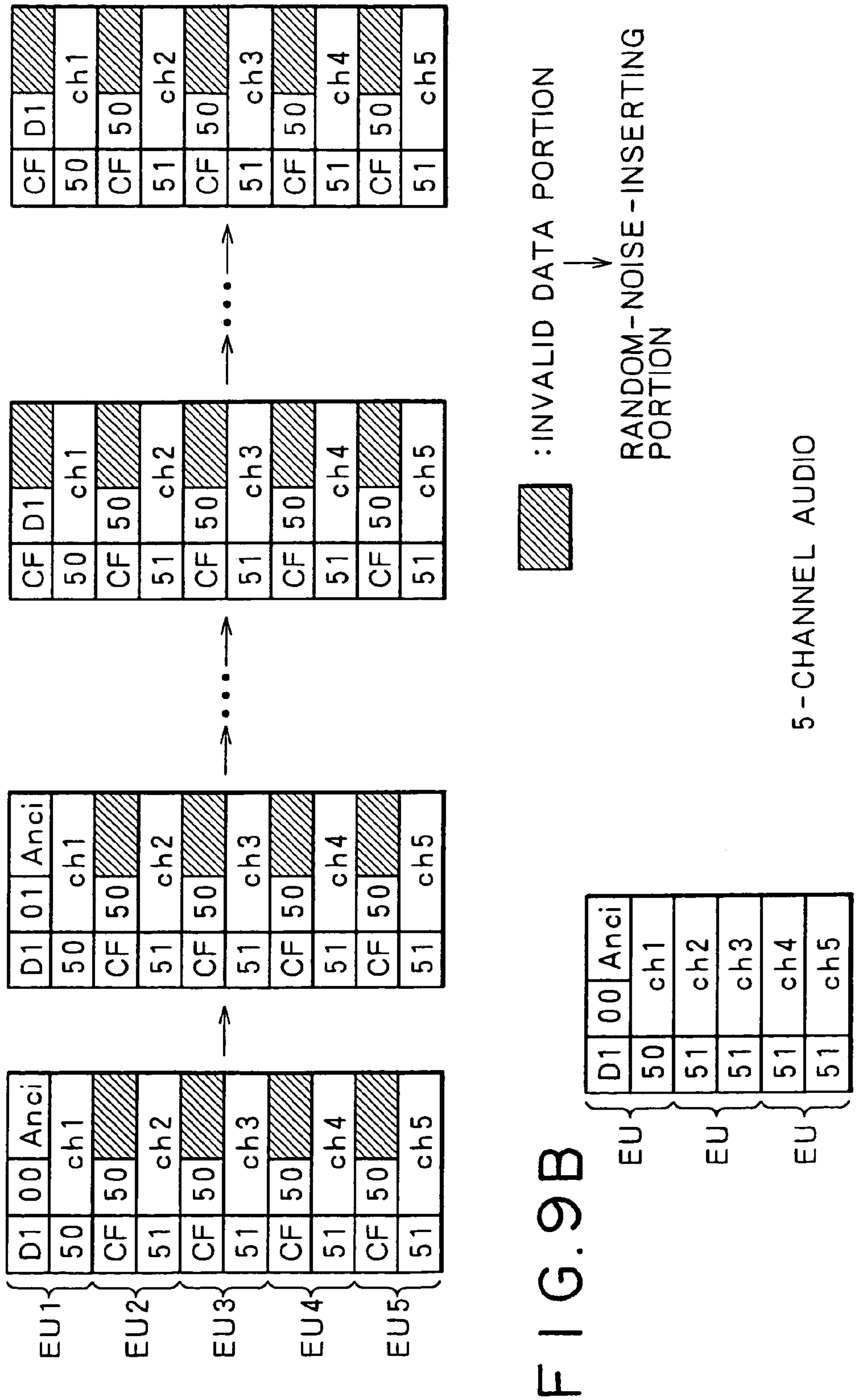
FIG. 9A is a diagram showing data structures adopted in a second embodiment wherein a random noise is inserted into 5-channel audio data for each EU (Encryption Unit)
FIG. 9B is a diagram showing a data structure of a single block of 5-channel audio data.
Figures 10A, 10B:
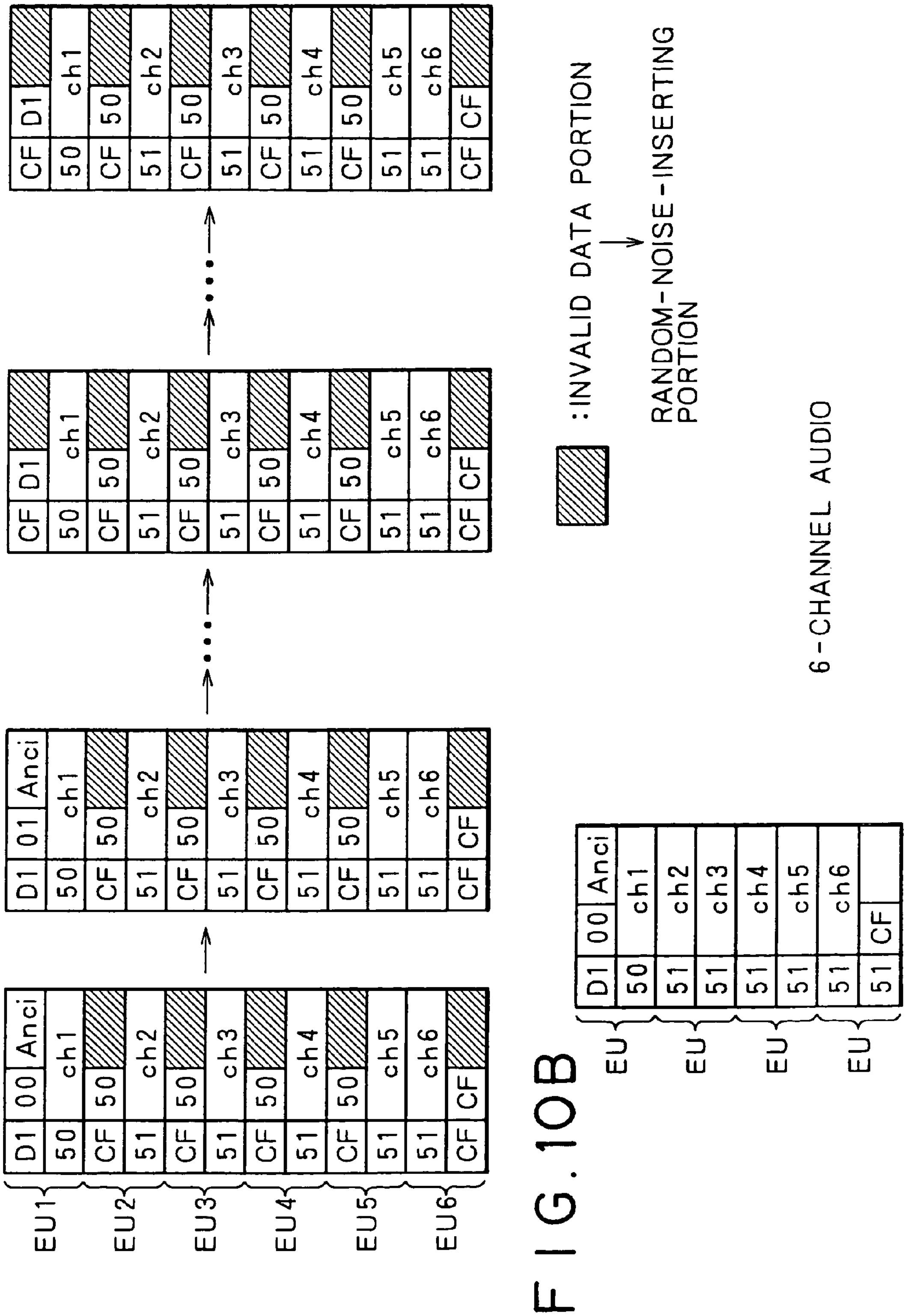
FIG. 10A is a diagram showing data structures adopted in the second embodiment wherein a random noise is inserted into 6-channel audio data for each EU (Encryption Unit)
FIG. 10B is a diagram showing a data structure of a single block of 6-channel audio data.

Likewise, FIGS. 9A and 9B show a second embodiment to transmit 1-bit-digital audio data of 5 channels whereas FIGS. 10A and 10B show the second embodiment to transmit 1-bit-digital audio data of 6 channels. In both cases, a random noise is inserted into each encryption unit in the same way.

To be more specific, FIG. 9A is a diagram showing blocks #0 to #1567 of transmitted 1-bit-digital audio data for 5 channels. In the case of 5-channel audio data, a block basically comprises 6 quadlets as shown in FIG. 9B. In the case of this embodiment, however, a block is composed of 10 quadlets including additional quadlets allowing invalid data to be inserted into each encryption unit EU as shown in FIG. 9A. Each of the additional quadlets has a label value of CFh. Thus, a block comprises 5 encryption units EU1 to EU5, and the encryption units EU2 to EU5 each include an invalid-data portion. Also in this case, the random-noise-adding unit 11 employed in the transmission apparatus 1 shown in FIG. 2 adds a random noise at least to each encryption unit EU that may likely contain all zeros or a fixed pattern. Thus, in the case of block #0, a random noise is inserted into bytes 2 and 3 of quadlets each used as an invalid-data portion of the encryption units EU2 to EU5. In FIG. 9A, bytes 2 and 3 are each indicated by a hatched box. A random noise is also inserted into blocks #1 to #(x−1) in the same way as block #0.

In the case of blocks #x to #1567, a random noise is inserted into bytes 2 and 3 of the first quadlet used as an invalid-data portion of the encryption unit EU1 and bytes 2 and 3 of the quadlets each used as an invalid-data portion of the encryption units EU2 to EU5. Bytes 2 and 3 of the quadlets are each indicated by a hatched box.

After a random noise has been inserted as described above, the encrypting unit 12 encrypts the data and outputs the encrypted data to the transmission line 3.

Much like the audio data of 2 channels described above, the insertion of random noises into the audio data of 5 channels eliminates the risk of the encryption algorithm's being inferred by extraction and decryption of an encryption unit. In addition, processing carried out by the reception apparatus 2 is also extremely simple as well.

On the other hand, FIG. 10A is a diagram showing blocks #0 to #1567 of transmitted 1-bit-digital audio data for 6 channels. In the case of 6-channel audio data, a block basically comprises 8 quadlets as shown in FIG. 10B. In the case of this embodiment, however, a block is composed of 12 quadlets including additional quadlets allowing invalid data to be inserted into each encryption unit EU as shown in FIG. 10A. Each of the additional quadlets has a label value of CFh. Thus, a block comprises 6 encryption units EU1 to EU6, and the encryption units EU2 to EU6 each include an invalid-data portion. Also in this case, the random-noise-adding unit 11 employed in the transmission apparatus 1 shown in FIG. 2 adds a random noise at least to each encryption unit EU that may likely contain all zeros or a fixed pattern. Thus, in the case of block #0, a random noise is inserted into bytes 2 and 3 of quadlets each used as an invalid-data portion of the encryption units EU2 to EU6. In FIG. 10A, bytes 2 and 3 are each indicated by a hatched box. A random noise is also inserted into blocks #1 to #(x−1) in the same way as block #0.

In the case of blocks #x to #1567, a random noise is inserted into bytes 2 and 3 of the first quadlet used as an invalid-data portion of the encryption unit EU1 and bytes 2 and 3 of the quadlets each used as an invalid-data portion of the encryption units EU2 to EU6. Bytes 2 and 3 of the quadlets are each indicated by a hatched box.

After a random noise has been inserted as described above, the encrypting unit 12 encrypts the data and outputs the encrypted data to the transmission line 3.

Much like the audio data of 2 channels described above, the insertion of random noises into the audio data of 6 channels eliminates the risk of the encryption algorithm's being inferred by extraction and decryption of an encryption unit. In addition, processing carried out by the reception apparatus 2 is also extremely simple as well.

Figure 11:
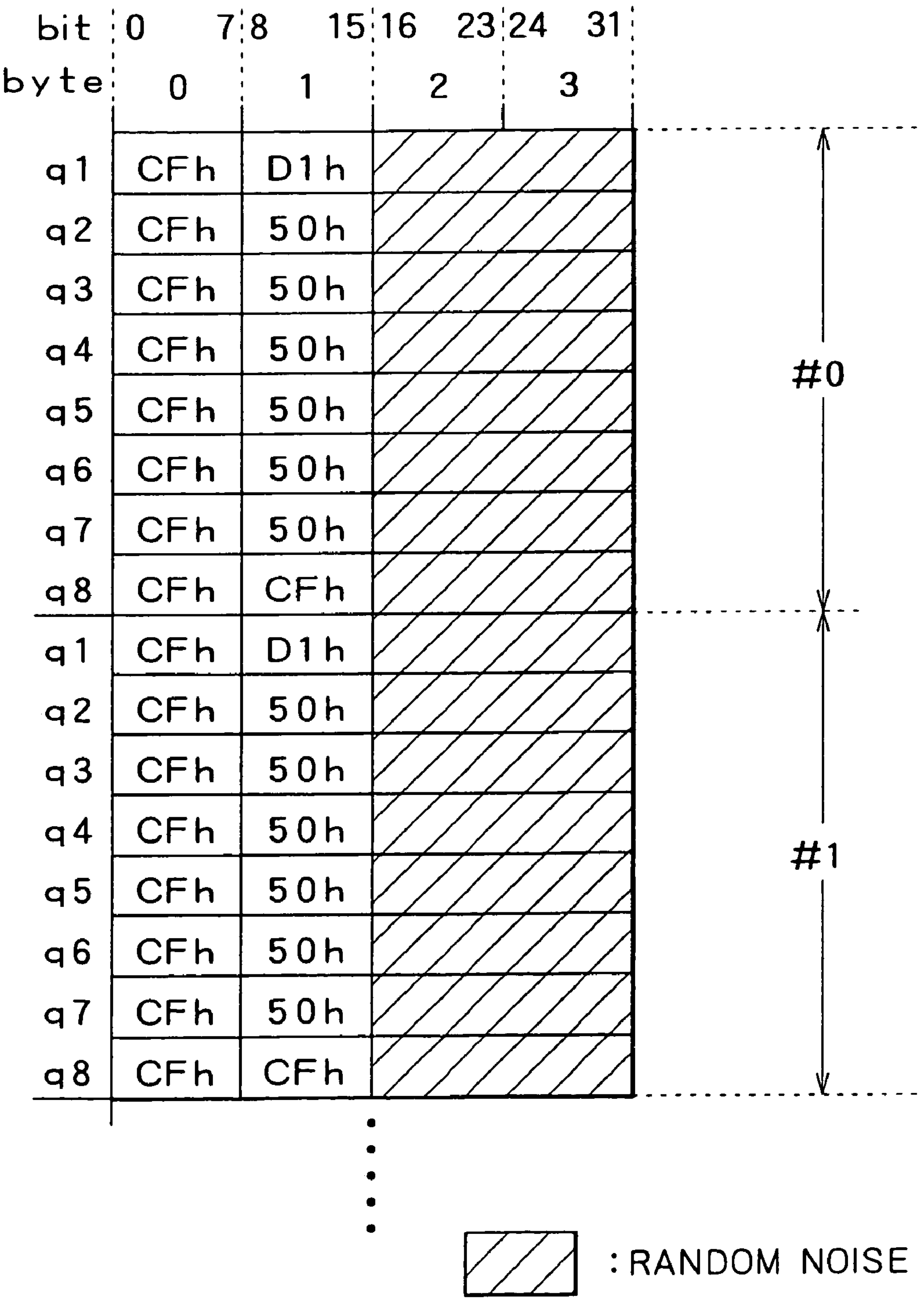
FIG. 11 is a diagram showing a data structure adopted in a third embodiment wherein a random noise is inserted into digital audio data.

5: Third Example of Adding Random Noise in IEEE-1394 Transmission of Audio Packet Data The following description explains an example of the use of the transmission format conforming to the IEEE-1394 specifications in the transmission of data explained earlier by referring to FIG. 2. FIG. 11 is a diagram showing a data structure adopted in a third embodiment wherein a random noise is inserted into digital audio data. To be more specific, FIG. 11 shows blocks added to the beginning and the end of a track comprising a sequence of frames each shown in FIG. 7. Any arbitrary number of such blocks can be added to accommodate a random noise.

Each of the blocks shown in FIG. 11 comprises 8 quadlets q1 to q8 as is the case with each block shown in FIG. 7. The quadlets all have a label value of CFh indicating invalid data. The sub-labels of the quadlets q1 to q8 are set at D1h, 50h, CFh and other values. Indicated by a hatched box, bytes 2 and 3 in each of the quadlets q1 to q8 are filled up with a random noise. Any arbitrary number of blocks each filled up with a random noise can be added to the beginning and the end of a track to result in a track of data DTad shown in FIG. 3C. A result of encryption to be transmitted is shown in FIG.

3D. Thus, even if a portion at the beginning or the end of a track of the transmitted encrypted data DTs is extracted and decrypted on a trial-and-error basis, the encryption algorithm cannot be inferred since data included in the portion is an unknown random noise.

In addition, the insertion of a random noise into each block quadlet having a label value of CFh indicating invalid data keeps the processing carried out by the reception apparatus 2 extremely simple. To put it in detail, the decryption unit 22 employed in the reception apparatus 2 outputs a packet data stream like the one shown in FIG. 3C as a result of decryption to the random-noise-eliminating unit 23, which then merely needs to discard each quadlet with a label value of CFh shown in FIG. 11. Since a quadlet having a label value of CFh is a quadlet to be discarded anyway, it is not necessary for the random-noise-eliminating unit 23 to carry out special processing due to the insertion of a random noise. That is to say, the random noises shown in FIG. 11 can be discarded along with the invalid data in the no-data portions shown in FIG. 7.

Figure 12:
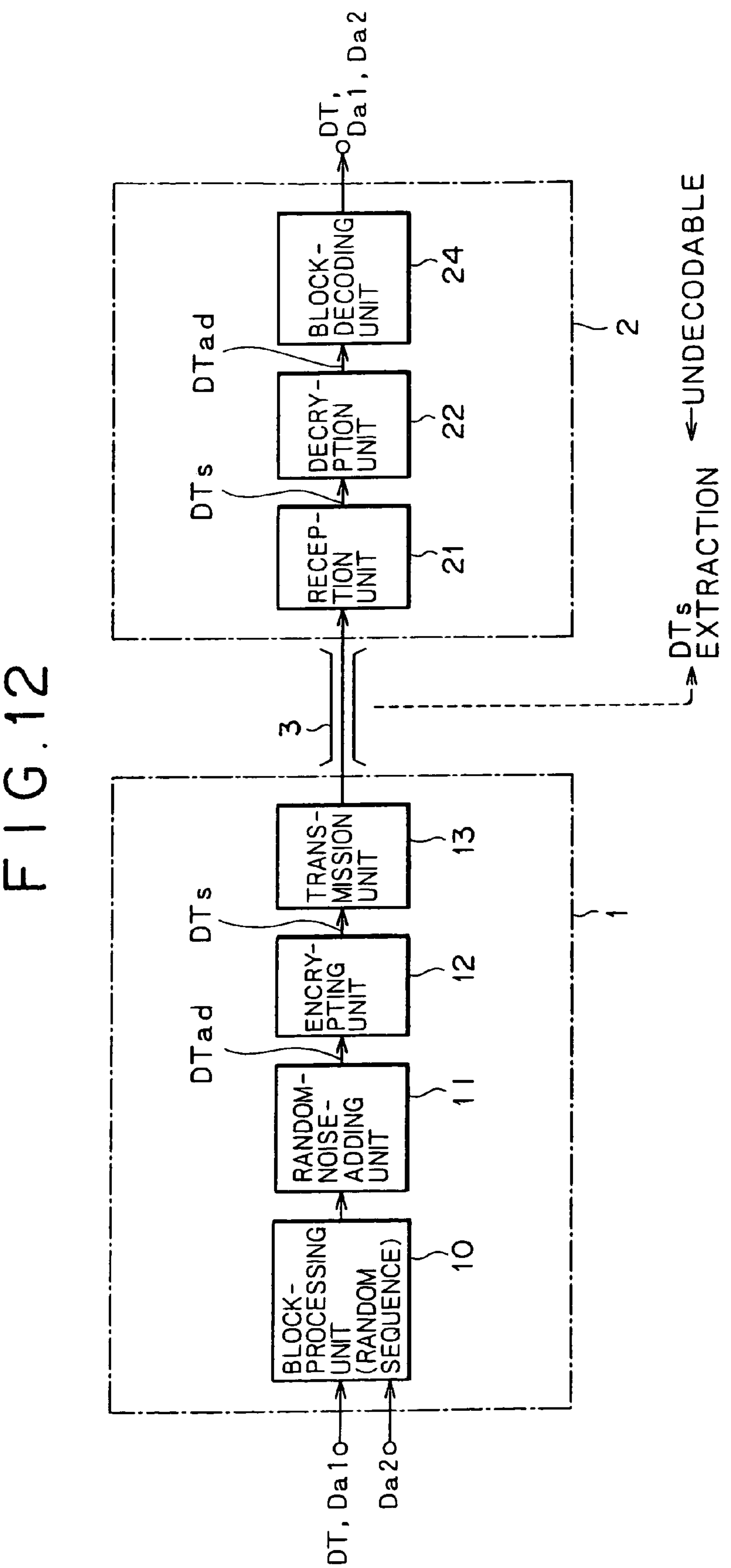
FIG. 12 is a block diagram showing a transmission system implemented by a fourth embodiment of the present invention.

6: Fourth Example of Adding Random Noise in IEEE-1394 Transmission of Audio Packet Data FIG. 12 is a block diagram showing a transmission & reception system implemented by a fourth embodiment of the present invention. Most of the configuration of the fourth embodiment is the same as the first embodiment shown in FIG. 2 except that, in the case of the first embodiment, only digital audio data DT such as music data is transmitted while, in the case of the fourth embodiment, pieces of additional data Da1 and Da2 appended to main digital audio data DT are also transmitted along with the main digital audio data DT.

The packet structure will be described later. The main digital audio data DT is typically 1-bit-digital audio data packet-converted or blocked into a format conforming to a predetermined transmission protocol. The pieces of additional data Da1 and Da2 are transmitted by being included in a block. Prior to transmission, the pieces of additional data Da1 and Da2 and the main digital audio data DT are encrypted.

Each block includes an area for accommodating the pieces of additional data Da1 and Da2 and an area filled up with invalid data. In this embodiment, at least either the piece of additional data Da2 or pieces of additional data Da1 and Da2 are inserted into a block selected at random from a sequence of blocks.

In this embodiment, the additional data Da2 is inserted into a block selected at complete random from a sequence of blocks. In actuality, it is thus impossible for an unauthorized user to extract an encrypted portion representing the additional data Da2 from the encrypted data DTs fetched from the transmission line 3. That is to say, it is impossible to extract an encrypted portion with known pre-encryption contents from the encrypted data DTs.

Even if the encrypted additional data Da2 can be extracted from the encrypted data DTs, the encrypted data DTs includes an encrypted random noise besides audio data. Thus, in processing to analyze the data DTs, a data element produced as a result of encrypting the audio data DT by using an encryption algorithm cannot be distinguished from a data element produced as a result of encrypting the random noise included in the data DTs by using the same encryption algorithm. As a result, it is even more difficult to infer the encryption algorithm. As described above, by virtue of this embodiment, it is all but impossible for an unauthorized person to decrypt data transmitted through the transmission line 3. Thus, the embodiment is very appropriate for transmission of data necessitating protection of a copyright or the like.

In addition, in the transmission apparatus 1 newly includes only a block-processing unit 10 for selecting a block at random from a sequence of blocks and adding the additional data Da2 to the selected block, and a random-data-adding unit 11 for inserting a random noise. Thus, the configuration of the transmission apparatus 1 cannot be said to be that complex. As a result, the transmission apparatus 1 implemented by the embodiment can be incorporated in various kinds of equipment with ease.

It should be noted that, even if a block into which additional data Da2 is inserted is selected at random, a decoding process carried out by the reception apparatus 2 does not become complicated. As will be described in detail later, a label explicitly indicating the additional data Da2 is included in the block. Thus, a block-decoding unit 24 employed in the reception apparatus 2 merely needs to extract the additional data Da2 indicated by the label. For the same reason, a random noise can be removed with ease. That is to say, since a random noise is inserted into an invalid-data portion indicated by a predetermined label, the block-decoding unit 24 employed in the reception apparatus 2 merely needs to discard the invalid-data portion indicated by the predetermined label. Thus, the configuration of the reception apparatus 2 cannot be said to be that complex. As a result, the reception apparatus 2 implemented by the embodiment can be incorporated in various kinds of equipment with ease.

Conceivable examples of the additional data Da1 are ancillary data Anci and supplementary data Suppli, whereas conceivable examples of the additional data Da2 are an ISRC (International Standard Record Code) for identifying the title of a song, a text describing the title of a song and the name of an artist, which can be the name of a singer, the name of a performer, the name of a song composer, the name of a song writer or the name of an arranger.

FIGS. 13A, 13B, 14 and 15 are each a diagram showing a frame obtained as a result of inserting pieces of additional data Da1 and Da2 into the frame shown in FIG. 7 by mixing the additional data with other blocks. It should be noted that FIGS. 13A, 13B, 14 and 15 shows only the first quadlet q1 of each block in the frame, that is, the top quadlet of each block shown in FIG. 8D.

Figures 13A, 13B:
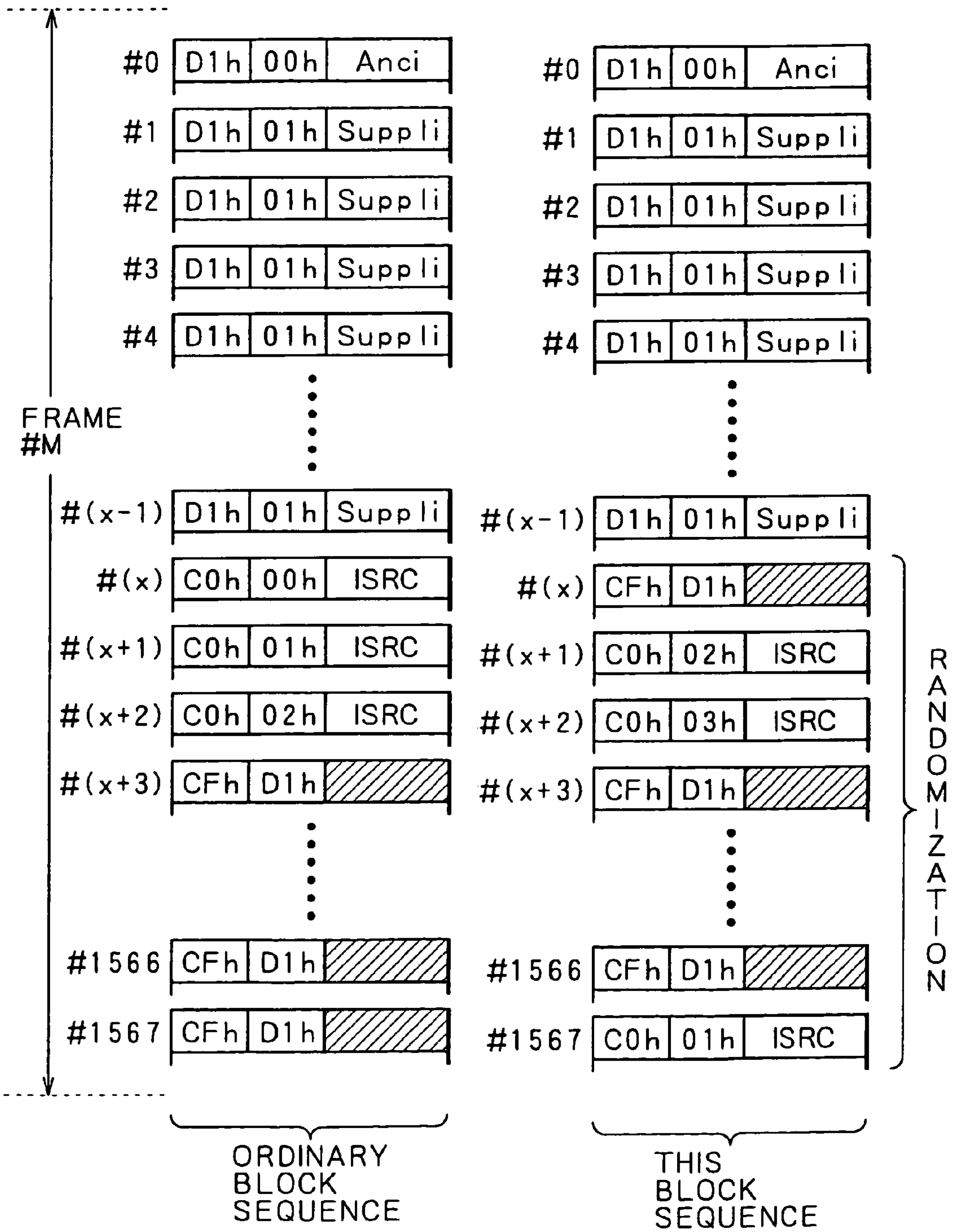
FIG. 13A is a diagram showing an ordinary sequence of blocks with additional data added thereto.
FIG. 13B is a diagram showing a sequence of blocks with additional data added thereto in accordance with the fourth embodiment.

FIG. 13A shows an ordinary sequence of blocks as a reference for comparison purposes. In the case of an ordinary sequence of blocks shown in FIG. 13A, block #0 at the beginning of the sequence contains ancillary data Anci. Block #0 is followed by blocks #1 to #(x−1) each containing supplementary data Suppli. In this way, the additional data Da1, that is, the ancillary data Anci and pieces of supplementary data Suppli, is added sequentially to blocks starting with block #0.

If it is not necessary to insert additional data Da2 such as an ISRC, the first quadlet q1 of each of blocks #x to #1567 is used as an invalid-data portion. If it is necessary to insert additional data Da2 such as an ISRC, on the other hand, pieces of data Da2 are sequentially inserted following the supplementary data Suppli into blocks starting with block #x. In the case of the frame shown in FIG. 13A, pieces of information are sequentially inserted as ISRCs into blocks #x to #(x+2) each having a label value of COh and having sub-labels of 00h, 01h and 02h respectively. Blocks #(x+3) to #1567 each contain an invalid-data portion indicated by a hatched box. It should be noted that the invalid-data portion is filled up with a random noise as described above.

With such an ordinary sequence of blocks, however, it is feared that an unauthorized person is capable of knowing the location of an inserted ISRC or the number of a block into which an ISRC has been inserted. That is to say, if the number of blocks into which additional data Da1 is inserted is fixed, the number of a block (#x) into which an ISRC is inserted is also known since the ISRC follows the additional data Da1. In this case, the unauthorized person extracts block #x from the encrypted data DTs and, if the persons is capable of identifying the ISRC of a song included in block #x by utilizing some means, the person will also be capable of inferring the encryption algorithm with ease.

In order to solve the problem described above, a block-processing unit 10 provided by this embodiment selects blocks, into which at least additional data Da2 is to be inserted, at random as described above. FIG. 13B is a diagram showing a sequence of blocks including additional data Da2 inserted into blocks selected at random. Much like the ordinary sequence of blocks, block #0 at the beginning of the sequence contains ancillary data Anci. Block #0 is followed by blocks #1 to #(x−1) each containing supplementary data Suppli. If it is necessary to insert additional data Da2, additional data Da2 are inserted following the supplementary data Suppli into blocks selected at random among blocks #x to #1567. In the sequence of blocks shown in FIG. 13B, for example, additional data Da2 representing ISRCs is inserted into blocks #(x+1), #(x+2) and #1567. The remaining blocks among blocks #x to #1567 each include an invalid-data portion indicated by a hatched box. The random-noise-adding unit 11 fills up each invalid-data portion with a random noise.

Figure 14:
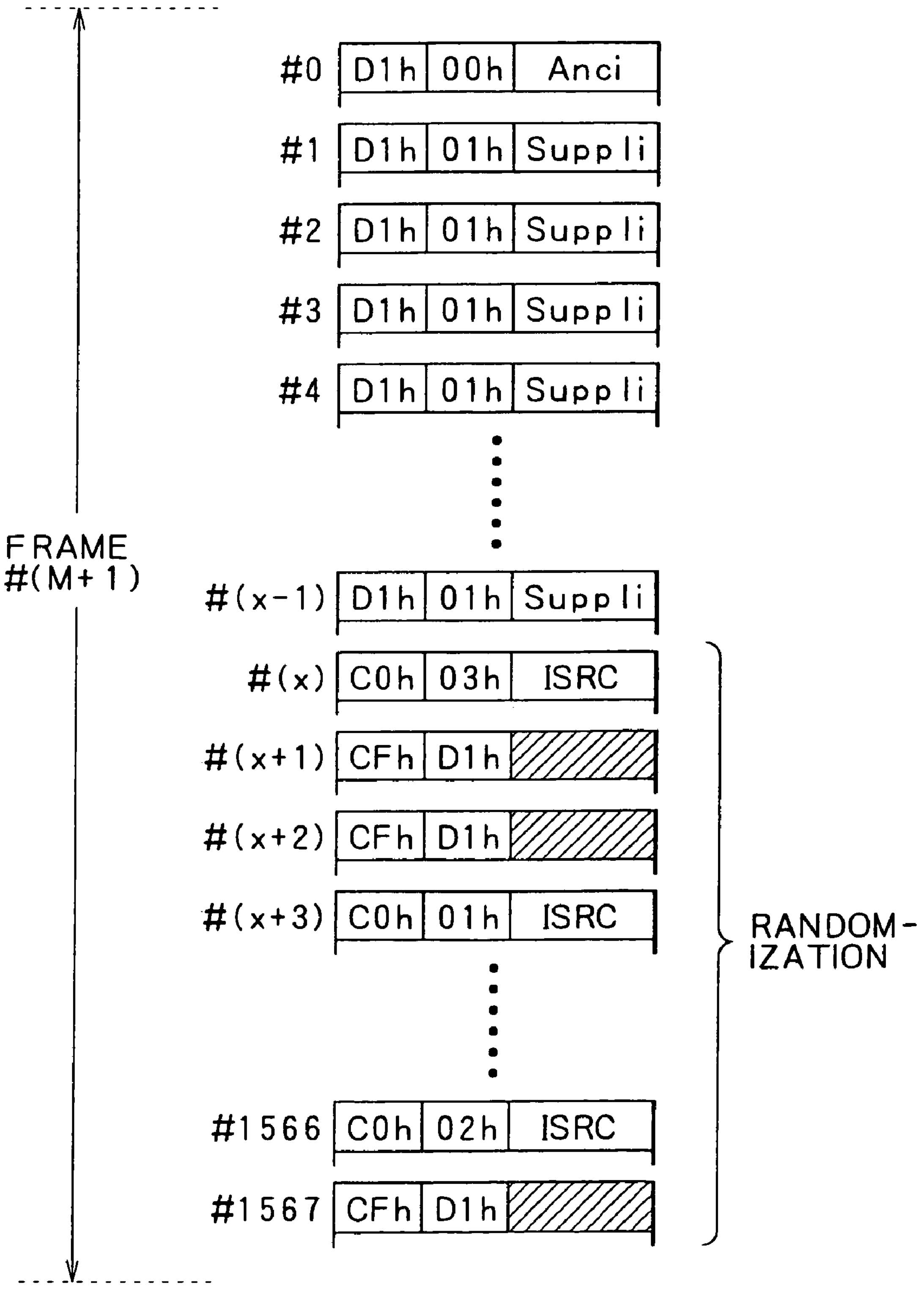
FIG. 14 is a diagram showing an embodiment implementing a method of inserting additional data at random.

Pieces of data Da2 are inserted into blocks selected at random among blocks #x to #1567 for each frame. Assume that FIG. 13B shows a sequence of blocks in frame #M. In this case, a typical sequence of blocks in frame #(M+1) is shown in FIG. 14. As shown in the figure, additional data Da2 representing ISRCs is inserted into typically blocks #x, #(x+3) and #1566. The remaining blocks among blocks #x to #1567 each include an invalid-data portion indicated by a hatched box.

In this embodiment, the block-processing unit 10 inserts additional data Da2 into blocks selected at random among blocks #x to #1567 of the sequence of blocks composing each frame. Thus, it is entirely impossible to predict which blocks in a data stream comprising the frames additional data Da2 has been inserted into. Then, the encrypting unit 12 encrypts data of such a sequence of blocks into encrypted data DTs output to the transmission line 3. It is thus all but impossible to extract portions containing additional data Da2 from the encrypted data DTs. As a result, it is possible to avoid illegal inference of the encryption algorithm described above. In addition, by filling each invalid-data portion with a random noise as described above, the encryption algorithm can be made even more difficult to infer.

It should be noted that the aforementioned insertion of additional data Da2 into blocks selected at random and the fact that the locations of the additional data Da2 vary from frame to frame as described above do not cause a problem in the reception apparatus 2. This is because the block-decoding unit 24 employed in the reception apparatus 2 merely needs to extract portions each having a label value of C0h from blocks composing each frame. In addition, the insertion of a random noise into each invalid-data portion does not make the processing carried out by the reception apparatus 2 complicated. This is because the block-decoding unit 24 employed in the reception apparatus 2 merely needs to discard quadlets each having a label value of CFh. Since a quadlet having a label value of CFh is a quadlet to be discarded anyway, it is not necessary for the block-decoding unit 24 to carry out special processing due to the insertion of a random noise.

Figure 15:
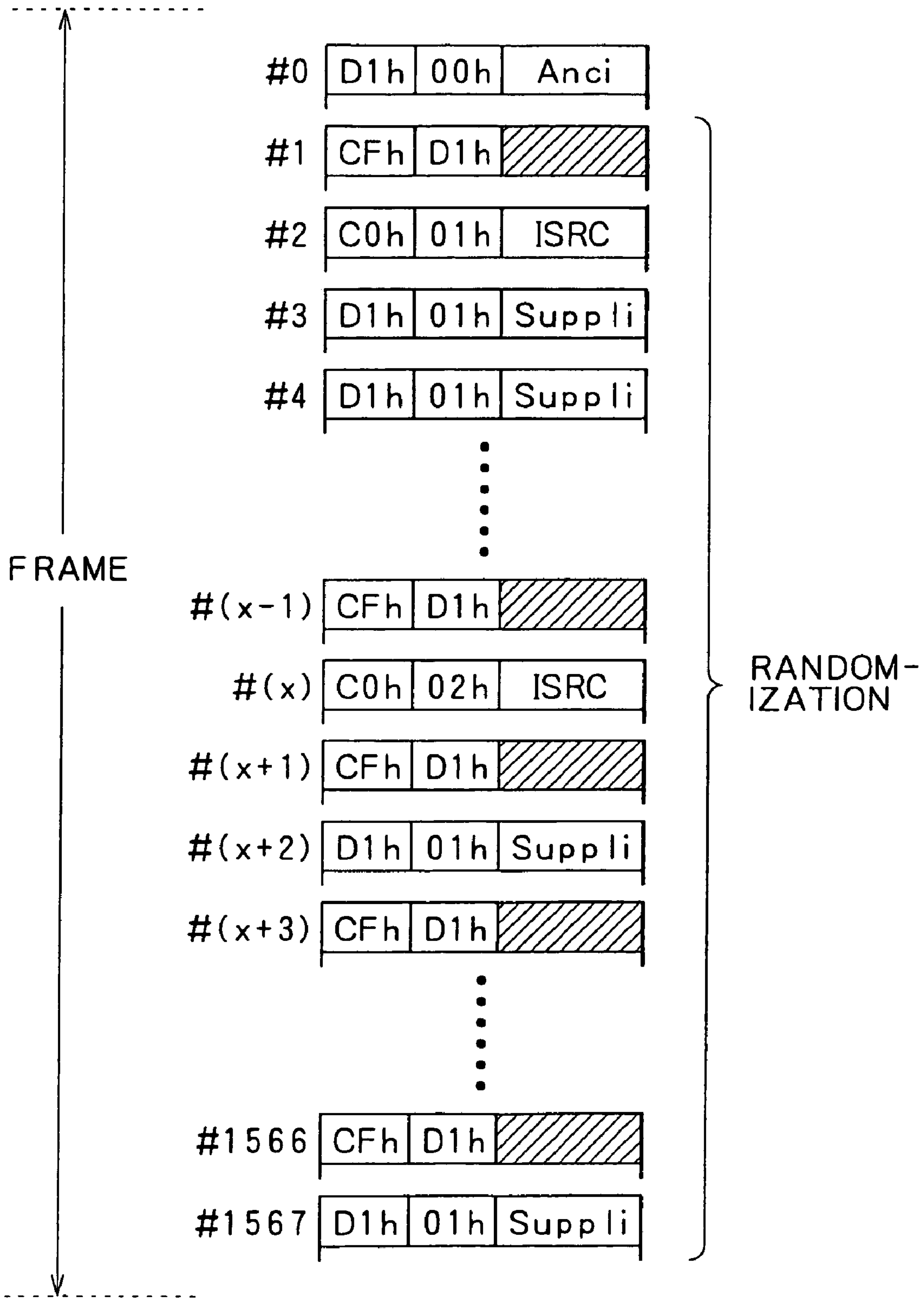
FIG. 15 is a diagram showing another embodiment implementing the method of inserting additional data at random.

By the way, the block-processing unit 10 may set a sequence of blocks into one shown in FIG. 15. In the case of the block sequences shown in FIGS. 13B and 14, the block-processing unit 10 inserts additional data Da2 into blocks selected at random among blocks #x and the subsequent blocks. In the case of the block sequence shown in FIG. 15, on the other hand, the block-processing unit 10 inserts additional data Da2 into blocks selected at random among blocks #1 to #1567.

Since block #0 at the beginning of the block sequence is prescribed as a block into which ancillary data Anci indicated by a label value of D1h and a sub-label of 00h is to be inserted, additional data Da1 or Da2 cannot be inserted into the block. However, it is free to select block #1 and the subsequent blocks as blocks into which additional data Da1 or Da2 is to be inserted. That is to say, supplementary data Suppli and ISRCs can be inserted as additional data Da1 and additional data Da2 respectively into any of the blocks without causing a problem in the reception apparatus 2 as long as contents of each quadlet are identified by using a label and a sub-label. Blocks into which additional data including supplementary data Suppli are to be inserted are thus selected at random as shown in FIG. 15.

In the case of the sequence of blocks composing a frame shown in FIG. 15, supplementary data Suppli is inserted as additional data Da1 into blocks #3, #4, #(x+2), . . . , and #1567 whereas ISRCs are inserted as additional data Da2 into blocks #2, #x and other blocks. Invalid-data portions not filled with additional data are each filled up with a random noise as indicated by a hatched box. FIG. 15 shows a typical frame in which supplementary data Suppli and ISRCs are inserted into blocks selected at random as described above. In the next frame, a frame following the next frame and other frames, the locations of supplementary data Suppli and ISRCs are entirely different from those in the frame shown in the figure.

By inserting additional data Da1 and Da2 including supplementary data Suppli into blocks selected at random as described above, it is even more difficult to identify for example the position of an inserted ISRC, the pre-encryption value of which is known. As a result, it is possible to enhance the effect of preventing the encryption algorithm from being inferred.

7: Typical Application of the Invention to Recording and Playback Apparatuses

The following description explains an embodiment of applying a data-transmitting apparatus or a data-transmitting method and a data-decoding apparatus or a data-decoding method, which are provided by the present invention, to recording and playback apparatuses respectively. A recording apparatus functions as a data-transmitting apparatus for transferring data to a recording medium and a playback apparatus functions as a data-decoding apparatus for reading out data from a recording medium.

Figure 16:
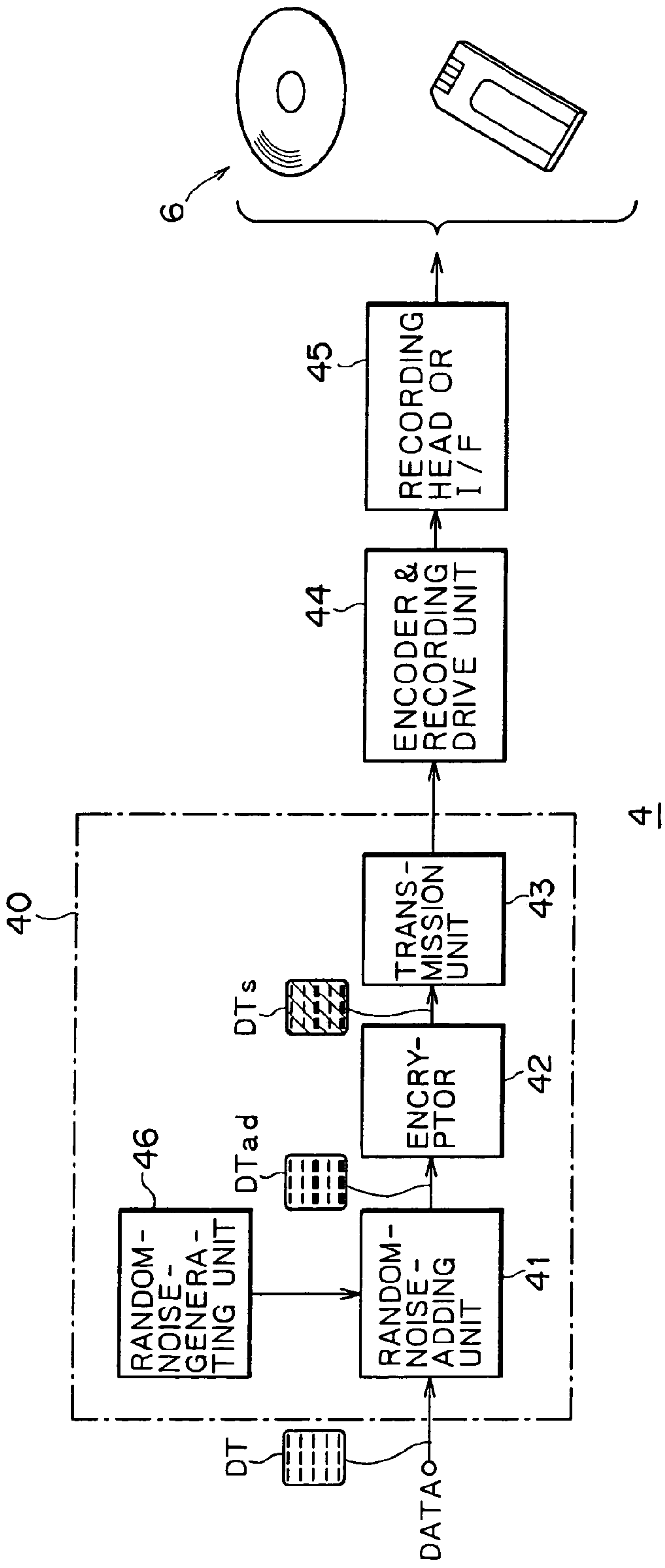
FIG. 16 is a block diagram showing a recording apparatus employing an encryption unit provided by the present invention.

FIG. 16 is a block diagram showing a recording apparatus 4 capable of recording data DT into a predetermined recording medium 6. As shown in FIG. 16, the recording apparatus 4 comprises an encrypting unit 40, an encoder & recording drive unit 44 and a recording head (or an interface) 45, which form a recording & processing system for processing and recording input data DT. The encrypting unit 40 comprises a random-noise-adding unit 41, an encryptor 42, a transmission unit 43 and a random-noise-generating unit 46.

In the recording apparatus 4, the random-noise-adding unit 41 adds random noises generated by the random-noise-generating unit 46 to the beginning and the end of each track (or each program) included in input data DT. The length of a random noise added to a program is varied to make the encryption algorithm difficult to infer.

The random-noise-adding unit 41 supplies data DTad including additional random noises to the encryptor 42 for encrypting the data DTad. The encryptor 42 supplies encrypted data DTs to the transmission unit 43, which forwards the data DTs to the encoder & recording drive unit 44. The encoder & recording drive unit 44 converts the format of the data DTs into a recording format of the recording medium 6 into which the data DTs is to be recorded. The encoder & recording drive unit 44 also adds an error correction code conforming to a modulation technique in addition to a variety of encoding processes to generate a recording drive signal supplied to the recording head 45. The recording head 45 carries out an operation to write the data DTs into the recording medium 6 in accordance with the recording drive signal.

Typically, the recording medium 6 is an optical disc, a magneto-optical disc, a magnetic disc, a magnetic tape or the like. In this case, the recording head 45 is an optical head or a magnetic head driven by the recording drive signal to perform a write operation. If the recording medium 6 is a memory card of typically a flash memory, on the other hand, the interface 45 makes a write access to the recording medium 6.

Figure 17:
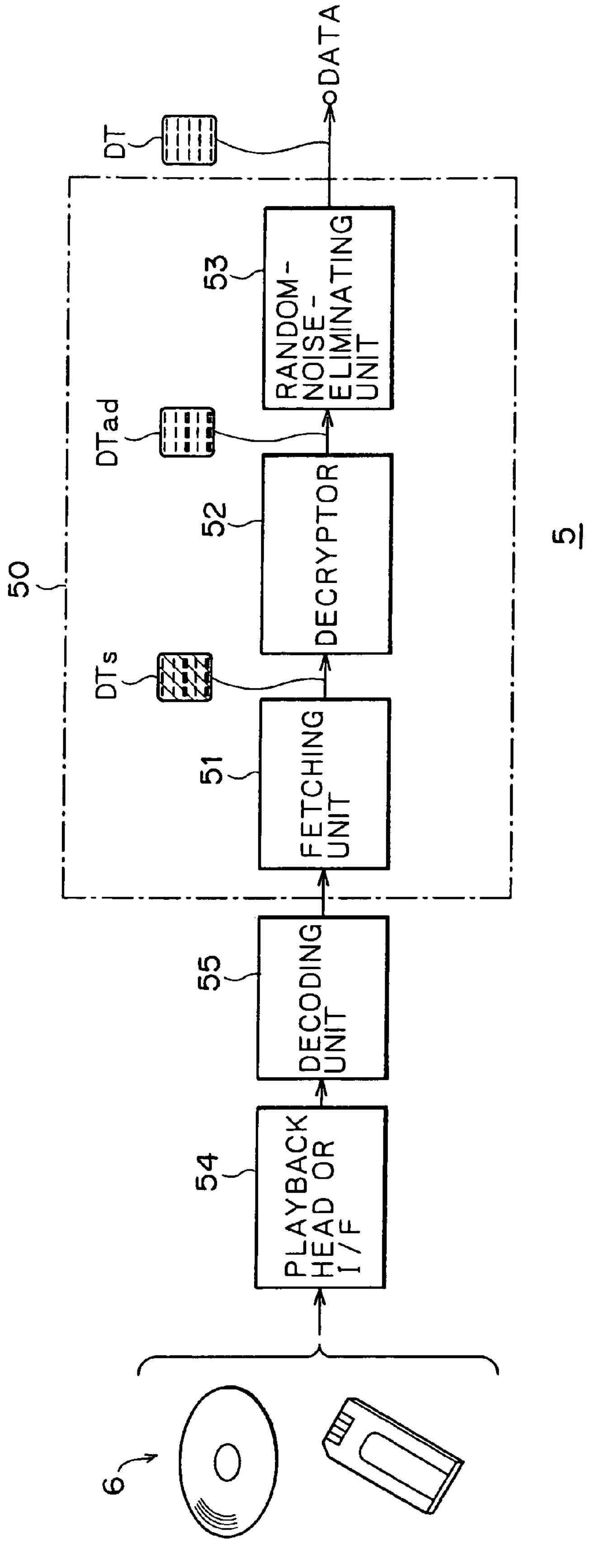
FIG. 17 is a block diagram showing a playback apparatus employing a decryption unit provided by the present invention.

FIG. 17 is a block diagram showing a playback apparatus 5 capable of playing back the data DT from the recording medium 6. As shown in the figure, the playback apparatus 5 comprises a playback head (or an interface) 54, a decoding unit 55 and a decryption unit 50, which has a fetching unit 51, a decryptor 52 and a random-noise-eliminating unit 53.

In the playback apparatus 5, the recording medium 6 is typically an optical disc, a magneto-optical disc, a magnetic disc, a magnetic tape or the like. In this case, the playback head 54 is an optical head or a magnetic head for reading out data from the recording medium 6. If the recording medium 6 is a memory card, on the other hand, the interface 54 makes a read access to the recording medium 6 to read out data from it. The data read out from the recording medium 6 is supplied to the decoding unit 55 for carrying out a decoding process conforming to the recording format of the recording medium 6 and error correction processing. Data produced by the decoding unit 55 is encrypted data DTs in the recording apparatus 4. This data is fetched by the fetching unit 51 employed in the decryption unit 50 and decrypted by the decryptor 52.

The decryptor 52 carries out decryption corresponding to an encryption algorithm adopted in the encryptor 42 to reproduce the data DTad including added random noises. The data DTad is supplied to the random-noise-eliminating unit 53, which removes random noises added thereto by the random-noise-adding unit 41, reproducing the original data DT.

In the configuration of the recording apparatus 4 described above, data DT to be recorded into the recording medium 6 is subjected to processing of adding random noises to the beginning and the end of each track to produce data DTad, which is subjected to an encryption process to generate encrypted data DTs. Thus, the beginning and the end of each track in the data DT are set to contain neither all zeros nor a fixed pattern such as 96h prior to an encryption of the data DT.

For the above reason, in a process to decode the data DTs read out from the recording medium 6 in the playback apparatus 5, the beginning and the end of each track in the data are each found to be a non-soundless portion. Therefore, in processing to analyze the data DTs, a data element produced as a result of encrypting audio data DT by using an encryption algorithm cannot be distinguished from a data element produced as a result of encrypting a random noise included in the data DTs by using the same encryption algorithm. As a result, it is all but impossible to infer the encryption algorithm.

That is to say, it is extremely difficult to decrypt data recorded into the recording medium 6 by the recording apparatus 4 unless the playback apparatus 5 is used for decrypting the data. Thus, the recording apparatus 4 and the playback apparatus 5 are very appropriate for an application such as recording data necessitating protection of a copyright. In addition, the configurations of the recording apparatus 4 and the playback apparatus 5 do not become that complex due to the application of the present invention as is the case with the transmission apparatus 1 and the reception apparatus 2 respectively. That is to say, the present invention can be applied to the recording apparatus 4 and the playback apparatus 5 with ease.

It should be noted that, even though the circuit configurations of the recording apparatus 4 and the playback apparatus 5 are shown separately from each other in FIGS. 16 and 17 respectively, the recording apparatus 4 and the playback apparatus 5 can of course be implemented as an integrated recording & playback apparatus. In addition, the recording apparatus 4 (or the recording & playback apparatus) does not necessarily include the encrypting unit 40. In the case of a recording apparatus for recording data received from a transmission apparatus through the transmission line 3, for example, the data received by the recording apparatus is already encrypted data DTs obtained as a result of encryption of original data including additional random noises provided that the transmission apparatus has the configuration shown in FIG. 2. Thus, in this case, the encrypting unit 40 is not required. By providing the playback apparatus 5 with the decryption unit 50 shown in FIG. 17, the received data can be played back. In a system for distributing typically pieces of music or the like, such a configuration is preferable.

It is needless to say that recording media for recording data encrypted by the encryption method provided by the present invention includes a disc medium represented by an optical disc, a magnetic medium represented by a magnetic tape and a memory medium represented by a flash memory.

The scope of the present invention further includes a variety of configurations besides the embodiments described above. In addition, the present invention can be incorporated in various kinds of equipment as a transmission apparatus, a reception apparatus, a recording apparatus, a playback apparatus or the like.

In the embodiments described above, the transmission system connecting the transmission apparatus 1 to the reception apparatus 2 is the transmission line 3, which is physical wires conforming to the IEEE-1394 specifications. It should be noted, however, that the transmission system may conform to other specifications. In addition, the present invention can also be applied to a radio transmission system such as satellite communication, radio telephone communication or infrared-ray transmission.

As is obvious from the above description, in accordance with the present invention, program data to be transmitted is subjected to a process of adding random noises to the data and a process of encrypting the data including the random noises prior to transmission. For example, a portion containing known pre-encryption data such as a sequence of all zeros representing a soundless part is included typically at the beginning or the end of a piece of original music. Such the known pre-encryption data of such a portion is converted into unknown data by a random noise added to the beginning or the end of the piece of music before the encryption process. That is to say, the known pre-encryption data is changed to a random noise prior to the encryption process. Thus, the present invention exhibits an effect that it is extremely difficult to infer the encryption algorithm even if the encrypted data is fetched in the course of transmission. As a result, the present invention is suitable for applications such as protection of a copyright.

In addition, in processing to decode encrypted data including additional random noises as described above, it is necessary to merely decrypt the data and then remove portions each including a random noise. That is to say, complicated processing to decode the encrypted data is not required. Thus, it is possible to implement a decryption apparatus having a simple configuration.

In other words, in accordance with the present invention, it is possible to implement transmission of data extremely difficult to decrypt without entailing complicated configurations of a data-transmitting apparatus and a data-decrypting apparatus.

Furthermore, in accordance with the present invention, the data length of a random noise added by the data-transmitting apparatus varies. It is thus difficult to recognize an actual soundless data portion. As a result, it is possible to enhance a function to prevent an encryption algorithm from being inferred.

Moreover, by using the data-transmitting apparatus and the data-decrypting apparatus as respectively a transmission apparatus and a reception apparatus in different pieces of equipment, the effects described above can be exhibited in transmission of data between the pieces of equipment.

On the top of that, by using the data-transmitting apparatus as an output apparatus for outputting data to be recorded in a recording apparatus for recording the data into a recording medium and using the data-decrypting apparatus as a decryption apparatus for decrypting playback data in a playback apparatus for reproducing the playback data from the recording medium, the effects described above can be exhibited in data recorded in the recording medium and data in recording and playback processes.

What is claimed is:

1. A transmission apparatus for converting digital data into a packet and transmitting said packet-converted digital data, said transmission apparatus comprising:

inserting means for inserting random data, having an arbitrary data length into a part of said packet-converted digital data to be transmitted, wherein said random data having said arbitrary data length includes first random data having a first arbitrary data length and second random data having a second arbitrary data length different than said first arbitrary data length, and said inserting means inserts said first random data at a beginning portion of said packet-converted digital data and said second random data at an end portion of said packet-converted digital data;

encryption means for encrypting said packet-converted digital data including said random data having said arbitrary data length inserted by said insertion means; and transmission means for transmitting said digital data encrypted by said encryption means.

2. The transmission apparatus according to claim 1, wherein said transmission means transmits said encrypted digital data by radio or wire communication.

3. The transmission apparatus according to claim 1, wherein said transmission means transmits said encrypted digital data as data to be recorded onto a recording medium.

4. The transmission apparatus according to claim 1, wherein said insertion means inserts said random data into an invalid-data portion existing in said packet.

5. The transmission apparatus according to claim 1, wherein a length of an encryption unit encrypted by said encryption means is smaller than a length of said packet-converted digital data.

6. The transmission apparatus according to claim 5, wherein said insertion means inserts said random data into said encryption unit.

7. A transmission method for converting digital data into a packet and transmitting said packet-converted digital data, said transmission method comprising the steps of:

inserting random data having an arbitrary data length into a part of said packet-converted digital data to be transmitted, wherein said random data having said arbitrary data length includes first random data having a first arbitrary data length and second random data having a second arbitrary data length different than said first arbitrary data length, and said inserting step inserts said first random data at a beginning portion of said packet-converted digital data and said second random data at an end portion of said packet-converted digital data;

encrypting said packet-converted digital data including said inserted random data having said arbitrary data length; and transmitting said encrypted digital data.

8. The transmission method according to claim 7, wherein a length of an encryption unit to be encrypted is smaller than a length of said packet-converted digital data and said random data is inserted into said encryption unit.

9. A transmission apparatus for encrypting a program comprising a continuous data stream and transmitting said encrypted program, said transmission apparatus comprising:

random-data-generating means for generating random data having an arbitrary data length;

addition means for adding said random data having said arbitrary data length generated by said random-data-generating means to said program, wherein said random data having said arbitrary data length includes first random data having a first arbitrary data length and second random data having a second arbitrary data length different than said first arbitrary data length, and said addition means adds said first random data at a beginning portion of said packet-converted digital data and said second random data at an end portion of said packet-converted digital data;

encryption-processing means for encrypting said program including said random data having said arbitrary data length added thereto by said addition means; and transmission means for transmitting said program encrypted by said encryption-processing means.

10. The transmission apparatus according to claim 9, wherein said transmission means transmits said encrypted digital data by radio or wire communication.

11. The transmission apparatus according to claim 9, wherein said transmission means transmits said encrypted digital data as data to be recorded onto a recording medium.

12. A transmission method for encrypting a program comprising a continuous data stream and transmitting said encrypted program, said transmission method comprising the steps of:

generating random data having an arbitrary data length;

adding said generated random data having said arbitrary data length to said program, wherein said random data having said arbitrary data length includes first random data having a first arbitrary data length and second random data having a second arbitrary data length different than said first arbitrary data length, and said adding steps adds said first random data at a beginning portion of said packet-converted digital data and said second random data at an end portion of said packet-converted digital data;

encrypting said program including said added random data having said arbitrary data length; and transmitting said encrypted program.

13. A transmission apparatus for encrypting a plurality of data blocks comprising main data and additional data and transmitting said encrypted data blocks, said transmission apparatus comprising:

additional-data-inserting means for carrying out processing to insert additional data into data blocks randomly selected from among a sequence of said data blocks composing a stream of said main data;

encryption means for encrypting said sequence of data blocks after said processing carried out by said additional-data-inserting means to insert said additional data;

transmission means for transmitting said sequence of data blocks encrypted by said encryption means; and random-data-inserting means for carrying out processing to insert random data having an arbitrary data length into selected ones of said data blocks, wherein said random data having said arbitrary data length includes first random data having a first arbitrary data length and second random data having a second arbitrary data length different than said first arbitrary data length, and said random-data-inserting means inserts said first random data at a beginning portion of said selected ones of said data blocks and said second random data at an end portion of said selected ones of said data blocks, wherein said encryption means encrypts said sequence of data blocks after said processing carried out by said additional-data-inserting means to insert said additional data and said processing carried out by said random-data-inserting means to insert said random data having said arbitrary data length.

14. The transmission apparatus according to claim 13, wherein said random-data-inserting means inserts random data into an invalid-data portion within each said selected ones of said data blocks.

15. The transmission apparatus according to claim 13, wherein said transmission means transmits said sequence of data blocks by radio or wire communication.

16. The transmission apparatus according to claim 13, wherein said transmission means transmits said sequence of data blocks as data to be recorded onto a recording medium.

17. A transmission method for encrypting a plurality of data blocks comprising main data and additional data and transmitting said encrypted data blocks, said transmission method comprising the steps of:

carrying out processing to insert additional data into data blocks randomly selected from among a sequence of said data blocks composing a stream of said main data;

encrypting said sequence of data blocks after said processing to insert additional data;

transmitting said sequence of encrypted data blocks; and processing to insert random data having an arbitrary data length into selected ones of said data blocks, wherein said random data having said arbitrary data length includes first random data having a first arbitrary data length and second random data having a second arbitrary data length different than said first arbitrary data length, and said processing step inserts said first random data at a beginning portion of said selected ones of said data blocks and said second random data at an end portion of said selected ones of said data blocks, wherein said sequence of data blocks is encrypted after said step of processing to insert said additional data and said step of processing to insert said random data having said arbitrary data length.

* * * * *